United States Patent [19]
Weng et al.

[11] Patent Number: 5,521,929
[45] Date of Patent: May 28, 1996

[54] ROBUST AND REDUNDANT PHYSICAL BLOCK IDENTIFICATION SCHEME FOR DATA STORAGE DEVICES

[75] Inventors: Lih-Jyh Weng, Shrewsbury, Mass.; Michael A. Brown, Phoenix, Ariz.

[73] Assignee: Quantom Corporation, Milpitas, Calif.

[21] Appl. No.: 261,372

[22] Filed: Jun. 16, 1994

[51] Int. Cl.[6] .............................. G06F 19/00; G11B 15/18
[52] U.S. Cl. ............................................ 371/40.1; 360/72.2
[58] Field of Search ................................ 371/37.1, 38.1, 371/39.1, 40.1, 40.2–40.4; 320/94.1; 360/72.1, 72.2

[56] References Cited

U.S. PATENT DOCUMENTS

| | | | |
|---|---|---|---|
| Re. 34,003 | 7/1992 | Weng | 360/72.2 |
| 4,633,471 | 12/1986 | Perera et al. | 371/38.1 |
| 4,677,623 | 6/1987 | Iwaski et al. | 371/39.1 |
| 4,733,396 | 3/1988 | Baldwin et al. | 371/38.1 |
| 4,794,594 | 12/1988 | Picard | 370/94.1 |

Primary Examiner—Paul P. Gordon
Assistant Examiner—Thomas E. Brown
Attorney, Agent, or Firm—David B. Harrison

[57] ABSTRACT

A method of uniquely identifying data blocks or groups of data blocks wherein a unique characteristic of the group or block is encoded according to an application of the Chinese Remainder Theorem. According to a particular application, physical addresses of sectors on a hard disk are encoded by applying the Chinese Remainder Theorem, thereby providing a highly robust and fault tolerant means for locating the sectors.

54 Claims, 11 Drawing Sheets

ROBUST AND REDUNDANT PHYSICAL BLOCK IDENTIFICATION SCHEME FOR DATA STORAGE DEVICES

FIELD OF THE INVENTION

This invention relates to computer systems in general and more particularly to methods for uniquely identifying data.

BACKGROUND OF THE INVENTION

Computer systems transfer and store data in many different formats on many different types of media. For example, busses and networks are used for high speed transfer of data streams, while disk and tape drives are used for sequential storage of large blocks of data segments. Regardless of the type of storage medium or the transfer means used, each data segment transferred and stored must be uniquely identifiable in order to distinguish it from other data segments.

Data segments such as data blocks on magnetic and optical disks, data blocks on tape, packets transferred over a network, or data messages on message based busses typically have associated with them a field for unique identification. Such data segments may also have other types of unique identification fields associated with them; for instance, password fields, record numbers, time stamps, node IDs, or the like. Reliable means for storing and retrieving these unique identification fields is required in order to prevent errors and data corruption that can occur when a unique identification field is improperly retrieved or corrupted.

On magnetic disks, for example, data is stored in circular tracks. Each track is divided into a number of data blocks usually consisting of a fixed number of bytes. Each data block usually consists of two sections, a header section and a data section. The data blocks on the disk are uniquely identified by physical address identification fields recorded in the header sections of the data blocks. The physical address field is a three dimensional field indicating sector, disk surface, and track number.

A disk drive has one or more read/write heads which must be positioned over data blocks to perform read or write operations on those blocks. Each head is associated with one disk surface. The radial positioning of the heads is typically controlled by a single head positioner. Thus when a read or write operation is to be performed to a particular data block, the head positioner moves the heads radially to the position of the track containing the block. Disk rotation then moves the successive blocks in the selected track under the head.

The selected head must read each data block header as it moves by and determine whether or not the data block is the requested block. This determination must be made by the time the end of the physical address identification field associated with the data block has reached the read/write head. That is, if the drive is to perform a read or write operation to a data block, it must be ready to do so when the data portion of the data block, which closely follows the header portion, rotates under the head.

In order to determine if a data block is the requested data block, the drive reads the physical address identification field from the disk and then compares it with the specified address of the data block in which data is to be read or written. If the addresses match, the data will be read from or written to the sector.

If an address identification field as read from a data block contains any errors, the data block may be mistakenly identified as another data block. Thus when the head is actually located over data block 100, the address may, for example, be identified as data block 101 because of a bit error, and the read or write operation that is to occur at data block 101 will be performed in the wrong location.

In the past, one or a combination of various methods have been used to protect the header fields of data blocks on disks or blocks on tapes, such as cyclic redundancy code (CRC), redundant copies of fields, and error correction codes (ECC).

According to the redundant copies of fields method, the physical address identification field is recorded several times in succession. The specified address is compared with each copy of the address identification fields stored in the data block header, and if some minimum number of retrieved address identification fields match the specified address the data block is determined to be the requested data block. Thus, if one of the copies of the address identification field contains an error, the data block will still be identifiable. This method, however, increases the data surface area required for the storage of the header field, thus reducing the data capacity of the disk. The surface area required for storage of the address identification fields increases, no less, as the error rate increases, since more copies of the address identification fields must be stored to satisfy required reliability specifications.

The more efficient CRC and ECC methods add redundancy bits to the physical address identification field in the header in such a way that errors can be detected. ECC utilizes further processing of the encoded address field to allow for correction of limited numbers of bit errors. ECC, however, requires time consuming calculations for corrections, and therefore requires a gap on the disk between the header and data fields, increasing the effective area used by the header information. Also, though both methods supply some fault tolerance and require less storage space than the address redundancy method, each still increases the data storage area required for the storage of the header field due to the extra bits required.

There is a longstanding need for a method of storing and locating unique identification fields associated with data segments such that the utilization of medium area for header information is minimized while the necessary fault tolerance, simplicity, speed, uniqueness, and robust detection are provided.

SUMMARY OF THE INVENTION

According to the principles of the invention, there is provided a method of encoding information corresponding to a unique characteristic of a data group. For each of the data groups within a data stream, a physical block identification word is produced as a series of remainder fields obtained by applying the Chinese Remainder Theorem to the information corresponding to the unique characteristic of the data group being read or written. The physical block identification word is then stored in a unique identification field associated with the data group. There is thus provided a compact, fault tolerant, and robust unique identification field for distinguishing data blocks or groups of data blocks.

According to various applications of the invention, the data stream can occur over a network, and the unique characteristic of the data group can be physical position information such as the location of a block on a track on a tape, or a radial track position on a hard disk, or a sector position on a track on a hard disk.

More specifically, there is provided a method for storing data groups on a data medium. Accordingly, information corresponding to a unique characteristic of a data group is encoded to produce a physical block identification word by providing a plurality of integer moduli which are relative prime in pairs; producing a physical block identification word comprising the integer remainders resulting from dividing the information corresponding to the unique characteristic of the block by each integer moduli; and storing the physical block identification word in a unique identification field associated with the data group.

According to another aspect of the invention, a method is provided for identifying unique data groups in a data stream or on a medium. The method includes the steps of choosing information M corresponding to a unique characteristic of a data group to be identified; producing an expected physical block identification word comprising the remainders [R(0), R(1), . . . ,R(L–1)] wherein R(i)=M MOD A(i) for i=(0,1, . . . ,L–1); comparing the expected physical block identification word [R(0),R(1), . . . ,R(L–1)] to a physical block identification word [R'(0),R'(1), . . . ,R'(L–1)] stored in the unique identification field associated with a data group in the data stream; declaring the data group associated with the physical block identification word [R'(0),R'(1), . . . ,R'(L–1)] as the data group to be identified if the comparison results in a number of remainders which differ by less than or equal to a threshold number of remainders; and identifying the data group associated with the physical block identification word [R'(0),R'(1), . . . ,R'(L–1)] as not being the data group to be identified if the comparison results in a number of remainders which differ by more than a threshold number of remainders. The information M may for example be a physical address of data block or group of blocks to be identified.

According to more specific aspects of the invention, there is provided a method of identifying a block (or group of blocks) on the medium relative to a block having a known physical block identification word. There is further provided a method of identifying a block (or group of blocks) on the medium using fewer of the moduli if the block is within a certain specified distance of a block having a known physical block identification number. Also provided are methods for optimizing the computation of the MOD function, particularly for computer systems which use binary representation of integers.

For hard disk drive applications in particular, this method takes advantage of the fact that the approximate position of the read/write heads relative to the media surface is typically known to within a relatively small number of contiguous tracks or blocks. There is a high probability that any real misplacement of the heads will occur within these contiguous tracks or blocks. When a physical block identification word is read in which most of the remainders match the expected remainders, it can be determined within a calculated probability that the correct block has been found, because and blocks having a physical block identification word containing the matching remainders are physically too far away from the present position of the heads to be the correct block. In other words, in the event of a real error, most or all of the remainders constituting the physical block identification word will not match.

According to this method, a unique data block identification scheme is provided which utilizes less area for storage of unique identification information than previous methods, thus increasing the data capacity of the medium, while providing increased fault tolerance, uniqueness, and robust detection.

DETAILED DESCRIPTION OF THE PREFERRED EMBODIMENT

Figure 1:
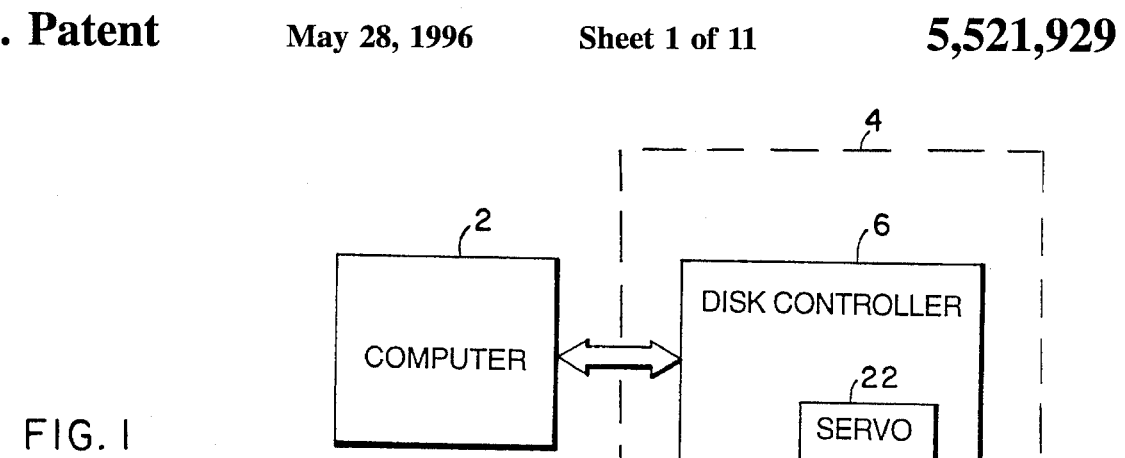
FIG. 1 is a representation of a typical hard disk drive for use with a computer system.

In FIG. 1 there is shown a computer 2 coupled to a hard disk drive 4. A disk controller 6 controls the transfer of data between the computer 2 and a hard disk 10. The hard disk 10 contains many data sectors 12 located on circular tracks 14. A magnetic head 16 driven by a head assembly 18 is located in the vicinity of a particular sector 20. A head positioning device 22, a servo controller, ensures that the head 16 is located very close to the sector 20 to be located; in other words, any mechanical error tends to place the head no further than a certain range of sectors 24 (shown greatly exaggerated) from the expected sector, this range being determined by the accuracy of the head positioning device 22.

Figure 1A:
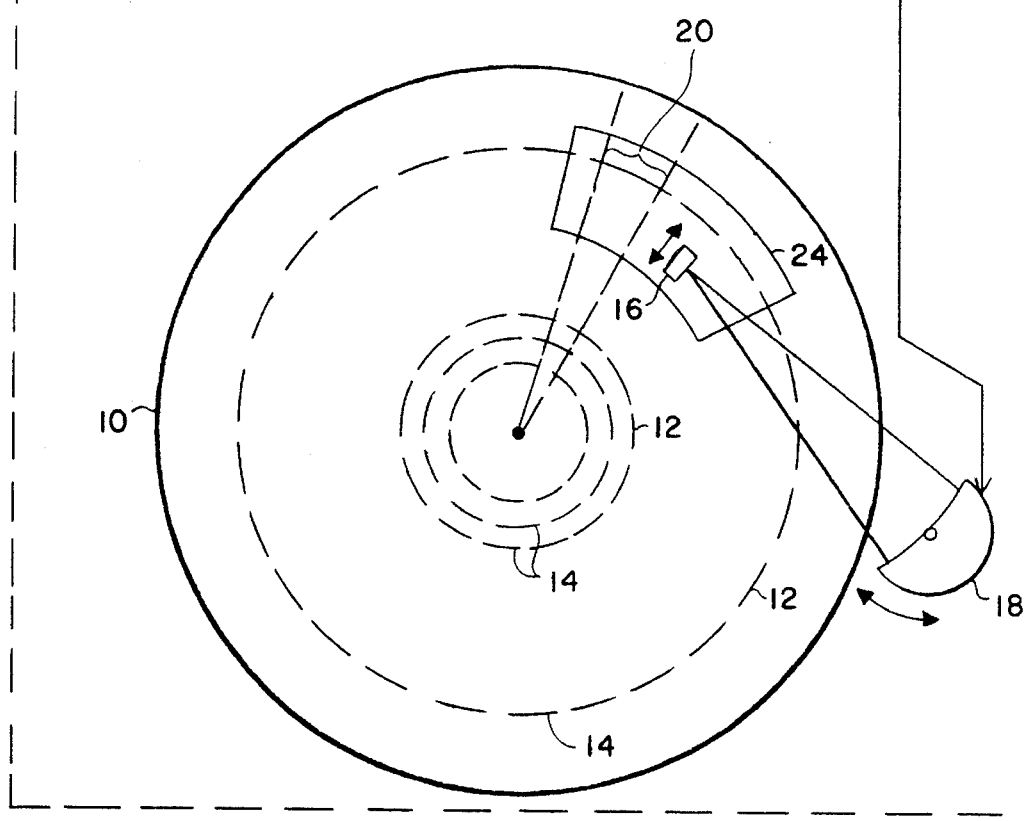
FIG. 1A represents the format of a data block for the disk drive of FIG. 1 according to one possible implementation.
Figure 1A:
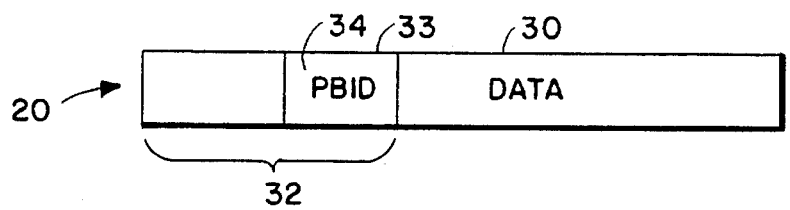

Referring to FIG. 1A, The sector 20 includes a data section 30 to which data is written or from which data is read. The sector 20 also includes a header section 32 which includes a unique identification field 33 containing a physical block identification word 34 used according to the principles of the invention for uniquely identifying sectors on the disk.

It is to be understood that the principles of the invention as herein described can be applied to the unique identification of data transferred by a variety of means to and from any type of data medium, and that the hard disk drive application is described by way of example as an implementation of the preferred embodiment of the invention. For example, the principles of the invention apply to data stored on various other types of magnetic media such as floppy disk and to optical disk media, which in principle have a similar sector format as magnetic disk media. The principles of the invention also apply to other magnetic media, such as tape, wherein tracks include contiguous blocks including data sections and header sections, and wherein physical block identification words would then reside in the header portion of the blocks on the tape. The novel principles can be further applied to network applications, wherein data are transmitted in packets having headers which contain sequencing information for identifying the packets. Furthermore, the principles of the invention apply to other types of unique identifiers of data segments; i.e. password fields, record numbers, command queue tags, time stamps, node ID's, and the like. The invention however will be described in terms of a particularly advantageous application to the physical addressing and location of data blocks in hard disk drives.

Figure 2:
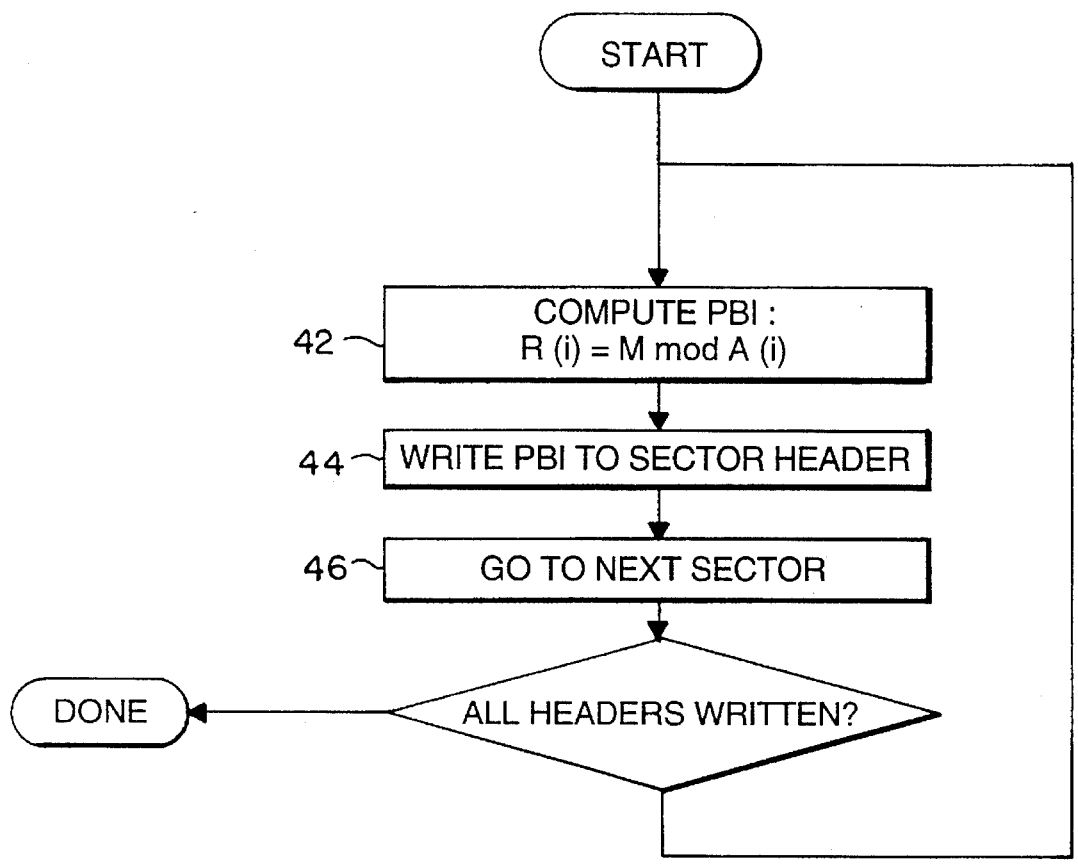
FIG. 2 is a flow diagram of a method of writing a physical block identification word to each sector on the disk according to one implementation of the principles of the invention.

Referring now to the flow chart of FIG. 2, the formatting of the disk 10 into sectors 12 requires the writing of a header section 32 to each sector 12 for unique identification of each sector 12 so that a data block or a group of data blocks within the sector can be repeatedly located. Header section 32 contains a physical block identification word 34 as determined by the process shown in the flow chart. A physical block address M represents the physical location of a sector 12 on the disk in terms of radial disk surface, radial track number, and circumferential sector. For example, the physical block address M might be a binary progression wherein each successive sector is addressed by a corresponding successive binary number (i.e. a logical block number), the number of bits of which will depend upon the number of sectors on a given track, the number of tracks on a disk, and the number of disk surfaces in the drive. According to the principles of the invention, the physical block address M is encoded into a series of remainders resulting from the application of the Chinese Remainder Theorem to the physical address (42). This series of remainders constitutes the physical block identification word 34 which is stored in the unique identification field 33 in the header section 32 of each sector 12 (44). The process is repeated until all sector headers have been written (46). The process of writing the physical block identification words 34 to the sectors 12 is usually performed during manufacturing or by an off-line utility. Henceforth any system accessing the disk drive 4 can uniquely identify any sector 12 on the disk according to its physical block identification word 34.

The Chinese Remainder Theorem is stated as follows:

Given a set of L integers $A(0), A(1), \ldots, A(L-1)$ that are pairwise relatively prime and a set of L integers $R(0), R(1), \ldots, R(L-1)$ with $R(i) < A(i)$ for $i = 0, 1, 2, \ldots, L-1$, then the system of equations $$M = R(i) \bmod A(i) \text{ for } i = 0, 1, 2, \ldots, L-1$$

has exactly one solution for M in the interval $$0 \leq M < A(0) * A(1) * \ldots * A(L-1).$$

Two integers are relative prime to each other if the greatest common divisor of the two integers is one. For example, the integers 3 and 4 are relative prime integers. The Chinese Remainder Theorem as stated above implies that any integer M in the range of 0 and $A(0)*A(1)* \ldots *A(L-1)-1$ can be represented uniquely as L-tuples:

$$M = [R(0), R(1), \ldots, R(L-1)].$$

Listed below is an example of the results generated by applying the theorem to obtain a series of unique physical block identification words. The prime integer moduli 7, 11, 5, and 13 are used as an example for the relative prime factors. The product of these factors is 5005; therefore, any unique integer between zero and 5004 can be identified by utilizing the remainders $R(0)$, $R(1)$, $R(2)$, and $R(3)$.

TABLE I

| Integer I.D. | A(0) = 7 | | A(1) = 11 | | A(2) = 5 | | A(3) = 13 | |
|---|---|---|---|---|---|---|---|---|
| | B(0) = ID/A(0) | R(0) = ID MOD A(0) | B(1) = ID/A(1) | R(1) = ID MOD A(1) | B(2) = ID/A(2) | R(2) = ID MOD A(2) | B(3) = ID/A(3) | R(3) = ID MOD A(3) |
| 0  | 0 | 0 | 0 | 0 | 0 | 0 | 0 | 0 |
| 1  | 0 | 1 | 0 | 1 | 0 | 1 | 0 | 1 |
| 2  | 0 | 2 | 0 | 2 | 0 | 2 | 0 | 2 |
| 3  | 0 | 3 | 0 | 3 | 0 | 3 | 0 | 3 |
| 4  | 0 | 4 | 0 | 4 | 0 | 4 | 0 | 4 |
| 5  | 0 | 5 | 0 | 5 | 1 | 0 | 0 | 5 |
| 6  | 0 | 6 | 0 | 6 | 1 | 1 | 0 | 6 |
| 7  | 1 | 0 | 0 | 7 | 1 | 2 | 0 | 7 |
| 8  | 1 | 1 | 0 | 8 | 1 | 3 | 0 | 8 |
| 9  | 1 | 2 | 0 | 9 | 1 | 4 | 0 | 9 |
| 10 | 1 | 3 | 0 | 10 | 2 | 0 | 0 | 10 |
| 11 | 1 | 4 | 1 | 0 | 2 | 1 | 0 | 11 |
| 12 | 1 | 5 | 1 | 1 | 2 | 2 | 0 | 12 |
| 13 | 1 | 6 | 1 | 2 | 2 | 3 | 1 | 0 |
| 14 | 2 | 0 | 1 | 3 | 2 | 4 | 1 | 1 |
| 15 | 2 | 1 | 1 | 4 | 3 | 0 | 1 | 2 |
| 16 | 2 | 2 | 1 | 5 | 3 | 1 | 1 | 3 |
| 17 | 2 | 3 | 1 | 6 | 3 | 2 | 1 | 4 |
| 18 | 2 | 4 | 1 | 7 | 3 | 3 | 1 | 5 |
| 19 | 2 | 5 | 1 | 8 | 3 | 4 | 1 | 6 |
| . | . | . | . | . | . | . | . | . |

TABLE I-continued

| | A(0) = 7 | | A(1) = 11 | | A(2) = 5 | | A(3) = 13 | |
| --- | --- | --- | --- | --- | --- | --- | --- | --- |
| Integer I.D. | B(0) = ID/A(0) | R(0) = ID MOD A(0) | B(1) = ID/A(1) | R(1) = ID MOD A(1) | B(2) = ID/A(2) | R(2) = ID MOD A(2) | B(3) = ID/A(3) | R(3) = ID MOD A(3) |
| . | . | | . | | . | | . | |
| . | . | | . | | . | | . | |
| . | . | | . | | . | | . | |
| 4997 | 713 | 6 | 454 | 3 | 999 | 2 | 384 | 5 |
| 4998 | 714 | 0 | 454 | 4 | 999 | 3 | 384 | 6 |
| 4999 | 714 | 1 | 454 | 5 | 999 | 4 | 384 | 7 |
| 5000 | 714 | 2 | 454 | 6 | 1000 | 0 | 384 | 8 |
| 5001 | 714 | 3 | 454 | 7 | 1000 | 1 | 384 | 9 |
| 5002 | 714 | 4 | 454 | 8 | 1000 | 2 | 384 | 10 |
| 5003 | 714 | 5 | 454 | 9 | 1000 | 3 | 384 | 11 |
| 5004 | 714 | 6 | 454 | 10 | 1000 | 4 | 384 | 12 |

Referring back to the flow chart of FIG. 2, the encoding of the physical block address into a physical block identification word at block 42 for storage in the header 32 (FIG. 1) can be accomplished as shown in Table I. The physical block address M, initially represented by the integer ID, encoded into a physical block identification word comprising the series of remainders [R(0),R(1),R(2),R(3)] (shown in bold in Table I.) for each integer ID. The physical block identification word M=[R(0),R(1),R(2),R(3)] is then stored in the unique identification field 33 of the header 32 for each data block (or group of data blocks).

Figure 3:
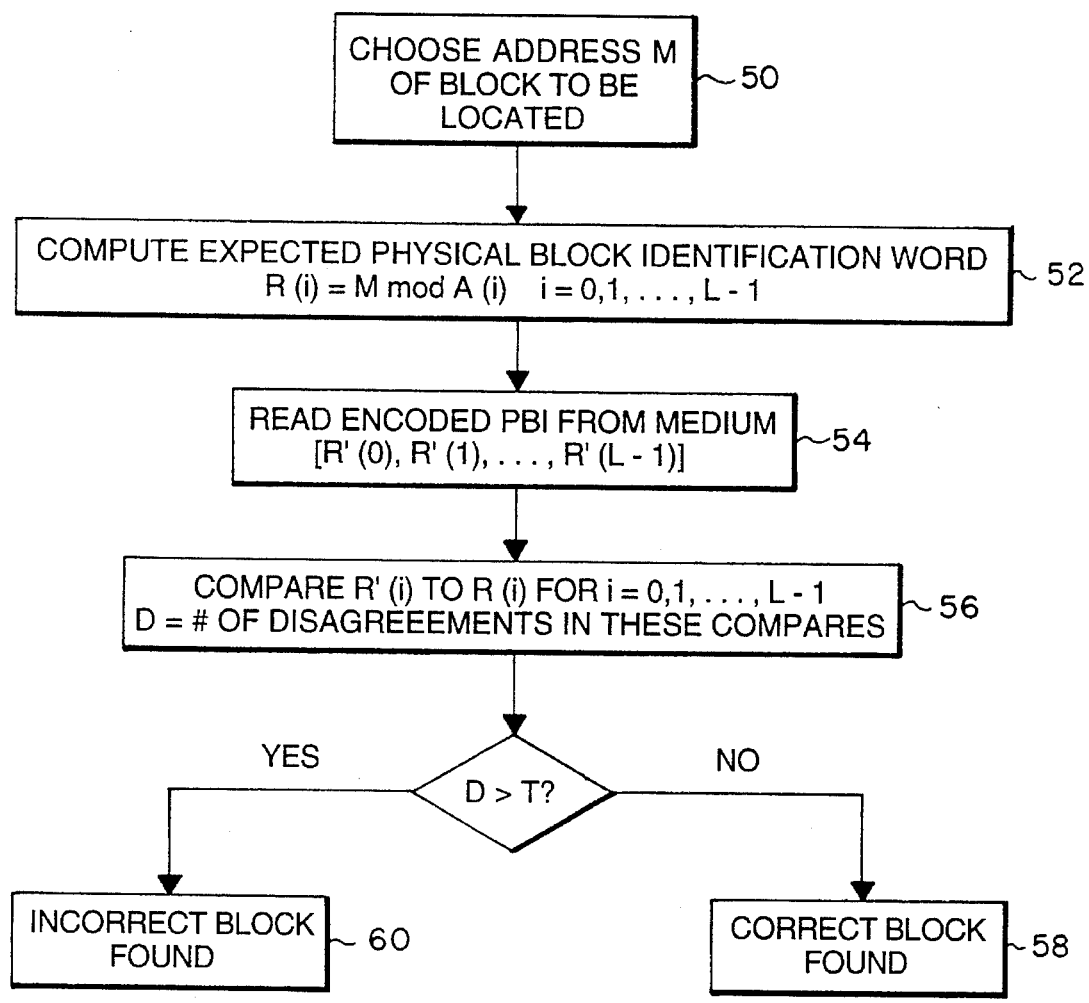
FIG. 3 is a flow diagram of a method of reading a block from the disk according to the invention.

Referring now to FIG. 3, there is shown a flow chart representing the process of reading a disk sector 14 and verifying that the correct physical block identification word (PBI) has been found. Accordingly, a physical block is chosen for seeking (50). R(i)=M rood A(i) is computed for all i=0,1, . . . ,L–1 (52) to obtain the encoded PBI M=[R(0), R(1), . . . ,R(L–1)]. Then an encoded PBI M'= [R'(0),R'(1), . . . ,R'(L–1)] is read from the disk (54). Next, M' is compared with M for all i=0,1, . . . ,L–1, and the number of disagreements in the comparison D is determined (56). If D is less than or equal to a certain threshold T, the correct PBI has been found (58). If D is greater than the threshold T, the PBI found is more likely to be in error and is therefore declared incorrect (60).

Fault tolerance is provided by the assignment of a physical block identification word according to the Chinese Remainder Theorem due to the system's knowledge that only a certain range of physical identification words are acceptable when the remainders are read from the media. The servo system 22 ensures that when the head 16 is misplaced from the sector sought, the misplacement will be relatively small in magnitude—probably within a few contiguous blocks or tracks. However, referring to Table I, it is apparent that contiguous blocks (represented by the integer ID) have physical identification words [R(0),R(1),R(2), R(3)] which differ in many positions.

For instance, according to the prior art methods of storing physical addresses on a disk, where physical addresses were stored in binary format in the header 32, physical address 8 would be stored as 1000 (binary 8) and physical address 9 would be stored as 1001 (binary 9). Suppose a seek occurs for physical address 8, but the value 1001 is read back. This value may indicate that there was a read error in the least significant bit of the physical address, or it may indicate that the head is misplaced by one contiguous sector such that the head actually resides over physical block 9. It is not possible to determine which is the case. Furthermore, suppose the value 1011 is read. This may indicate that two bit errors have occurred during the attempt to read the physical address 1000, or it may indicate that the head 16 (FIG. 1) is actually positioned over physical block 1011. It is not outside the realm of possibility that physical block 1011 has been found by mistake during a seek for physical block 8. In general, using the prior art method, it is not possible to determine whether the head 16 is actually misplaced or whether a mere bit error has occurred during the reading of the physical address without additional information.

However, if the physical block identification words are instead stored in the header 32 according to the principles of the present invention, then if the head 16 is misplaced by one contiguous sector, the physical block identification word read will differ in all four positions; that is, D=4. It is unlikely that single or multiple media defects will corrupt all four remainder positions. Conversely, if only one or two remainder positions in the physical block identification word read are corrupted, it is unlikely that the remainders read can belong to the sector they appear to represent, since the servo system 22 prevents the head 16 from being grossly misplaced over a sector that is so physically far away from the position sought.

For example, the contiguous physical addresses M=8 and M=9 are encoded as physical block identification words [1,8,3,8] and [2,9,4,9]. If physical address 8 is sought, and a PBI [1,8,4,8] is read, it is apparent that the value read could not have come from physical address 8 because the closest block having such a PBI is more that 385 blocks away from the location seeked, as will be seen later. Assuming a functional servo, there is a very low probability that the heads are misplaced by such a large distance. Furthermore, the only way the head could actually be misplaced over physical block 9 is if three of the remainders of the physical block identification word were read incorrectly—also very unlikely. Thus, it can be assumed that the correct PBI was found even though some of the PBI is corrupted.

In general, it is not necessary to decode M' from the remainders [R'(0),R'(1), . . . ,R'(L–1)] read from the disk. Given an expected PBI M=[R(0),R(1), . . . ,R(L–1)] and the actual PBI M'=[R'(0),R'(1), . . . ,R'(L–1)] which was read, if M' differs from M in exactly D remainders there are L–D remainders of M' and M which are identical. Applying the Chinese Remainder Theorem to these L–D remainders which are identical implies that M and M' are either identical or they differ by the subset of moduli corresponding to the L–D remainders which are identical. Thus, M and M' are either identical or they differ by the product of the least L–D elements among A(0),A(1), . . . ,A(L–1). Without loss of generality, it is assumed A(i)<A(i+1) for i=0,1, . . . ,L–2. The following table gives the minimum difference between M and M' if they differ in exactly D remainders.

TABLE II

| D | X = minimum difference between M and M' |
|---|---|
| 0 | A = A(0)*A(1)* ... *A(L-1) |
| 1 | A(0)*A(1)* ... *A(L-2) |
| 2 | A(0)*A(1)* ... *A(L-3) |
| k | A(0)*A(1)* ... *A(L-1-k) |
| L | 0 |

Therefore for D≦a given threshold T, it is ensured that M and M' are either identical or are different from each other by an amount of at least A(0)*A(1)* ... *A(L−1−T). If there are S errors in the remainders R(i) and R'(i), there are two scenarios:

1. M' came from the correct PBI, but was changed due to a read error such as noise. In this case, L−S remainders are correct and S remainders are in error. Therefore whenever S≦T, the PBI can be correctly identified. To enhance the probability of correct identification of the PBI when M' has been retrieved from a correct position, the value of T should be set as high as possible.

2. M' came from the incorrect PBI. If M' came from a location which is at most A(0)*A(1)* ... *A(U−1)−1 away from the location M, then at least L+i−U remainders of M' out of L remainders will be different from M. In other words, in the worst possible case, if M' came from a location which is at most A(0)*A(1)* ... *A(U−1)−1 away from the location of M, then there is a possibility that L+1−U of the remainders M are different from the remainders M'. Therefore, for a given threshold T, a miss-identification may occur when the noise makes changes of S remainders of the L+1−U remainders of M' to be identical to the corresponding remainders M. when this happens and L+1−U−S≦T, a miss-identification results. The minimum S for such a scenario to happen is S≧L+1−U−T. So, the miss-identification probability increases as T increases.

The proper selection of the threshold T is therefore important. The larger the value of T, the more fault tolerant the process is. However, the greater the value of T is, the higher the probability of miss-identification is in the case that M' comes from an incorrect address. An optimal choice for the value T can be chosen based on the given set of L factors A(0),A(1), ... ,A(L−1) and a given media read error rate.

In the example of Table I, a single defect affecting only one remainder would provide a minimum modulus of 385—that is, the closest block ID having the physical block ID read is 385 blocks away. Since the servo 22 prevents such a gross mechanical error, it can be assumed that the correct sector 14 has been found. Furthermore, the order of R(0), R(1),R(2) and R(3) is chosen to provide a sufficient modulus for the case when a single media defect corrupts the reading of two remainders. For example, a single defect would provide a minimum modulus of 65 if it spanned the R(0) and R(1) remainders. The minimum modulus is 35 for two defects: a defect in R(1) and a defect in R(3). If defects corrupt all four remainders, there may be an error that is not detected. Additional remainders may be added to match the code to the expected media error rates.

Note also that, in this example, fault tolerance is obtained at the cost of one extra bit over the bits that would be required to store the unencoded address in a binary format, thus there is a very small medium area cost of the implementation. 13 bits are required to represent 5005 unique locations in a binary format. By encoding the bits as described, 14 bits are required to represent the result; that is, 3 bits for A(0)=0–6, 4 bits for A(1)=0–10, 3 bits for A(2)=0–4, and 4 bits for A(3)=0–12.

Even greater moduli can be obtained by using greater relative prime numbers, at the expense of slight increases in media area. If, for example, the prime numbers 19, 23, 29, and 31 are used, the minimum modulus for a single defect that affected two remainders would be 589. The size of the field required to store the physical block ID has increased from 14 bits to 20 bits, an increase of 43%. The span of physical block IDs, however, has increased from 5005 to 392,864. To represent this many physical block ID's in binary format would require 19 bits. Thus, relative to the number of locations uniquely identifiable, the 20 bit remainder representation results in an increase in media area of only 6% while adding significant robustness and redundancy.

It is important in hard disk drive applications that physical block identification occur quickly in order to prevent the need for extra disk revolutions to provide time to complete the comparisons. Thus, algorithms employing division or other such extensive recursion are expensive in terms of time of computation and silicon consumed. Several methods are therefore provided to maximize the speed with which PBI's can be identified according to the invention.

First, the Chinese Remainder Theorem can be used to verify the next PBI given that the present PBI is correctly identified. According to an aspect of the invention, a relatively fast method is provided for determining the PBI of a physical address to be seeked, provided the physical address to be seeked is not too far from the present physical address (or a known physical address, if the present one is not available). Let the present physical address be Mp, and the physical address to be seeked be M.

The present PBI is

Mp=[Rp(0), Rp(1), ... ,Rp(L−1)]

and the next PBI to be seeked is

M=[R(0),R(1), ... ,R(L−1)].

Then the difference of the two blocks is

E=M−Mp=[R(0)−Rp(0), R(1)−Rp(1), ... ,R(L−1)−Rp(L−1)].

Let e(i) denote R(i)−Rp(i). Then e(i) is modulo A(i); that is, e(i)=R(i)−Rp(i) if R(i)≧Rp(i), and e(i)=A(i) +R(i)−Rp(i) if R(i)<Rp(i).

The final value of e(i) is in the range of 0 and A(i)−1.

Conversely, given the present PBI Mp=[Rp(0), Rp(1), ... , Rp(L−1)] and the difference of the next PBI and the present PBI E=[e(0), e(1), ... ,e(L−1)], the representation of the next PBI can be obtained easily by R(i)=Rp(i)+e(i) mod A(i).

The above expression can be computed without division if all the A(i) are selected to be greater than the maximum possible value of e(i). Let Rt(i) represent a temporary remainder value for a temporary PBI Mt. The computation then becomes Rt(i)=Rp(i)+e(i);

R(i)=Rt(i) if Rt(i)<A(i)

R(i)=Rt(i)−A(i) if Rt(i)≧A(i).

In the event that e(i) is negative, the value for R(i) is obtained by Rt(i)=Rp(i)+A(i)+e(i);

R(i)=Rt(i) if Rt(i)<A(i);

R(i)=Rt(i)−A(i) if Rt(i)≧A(i).

Figure 4:
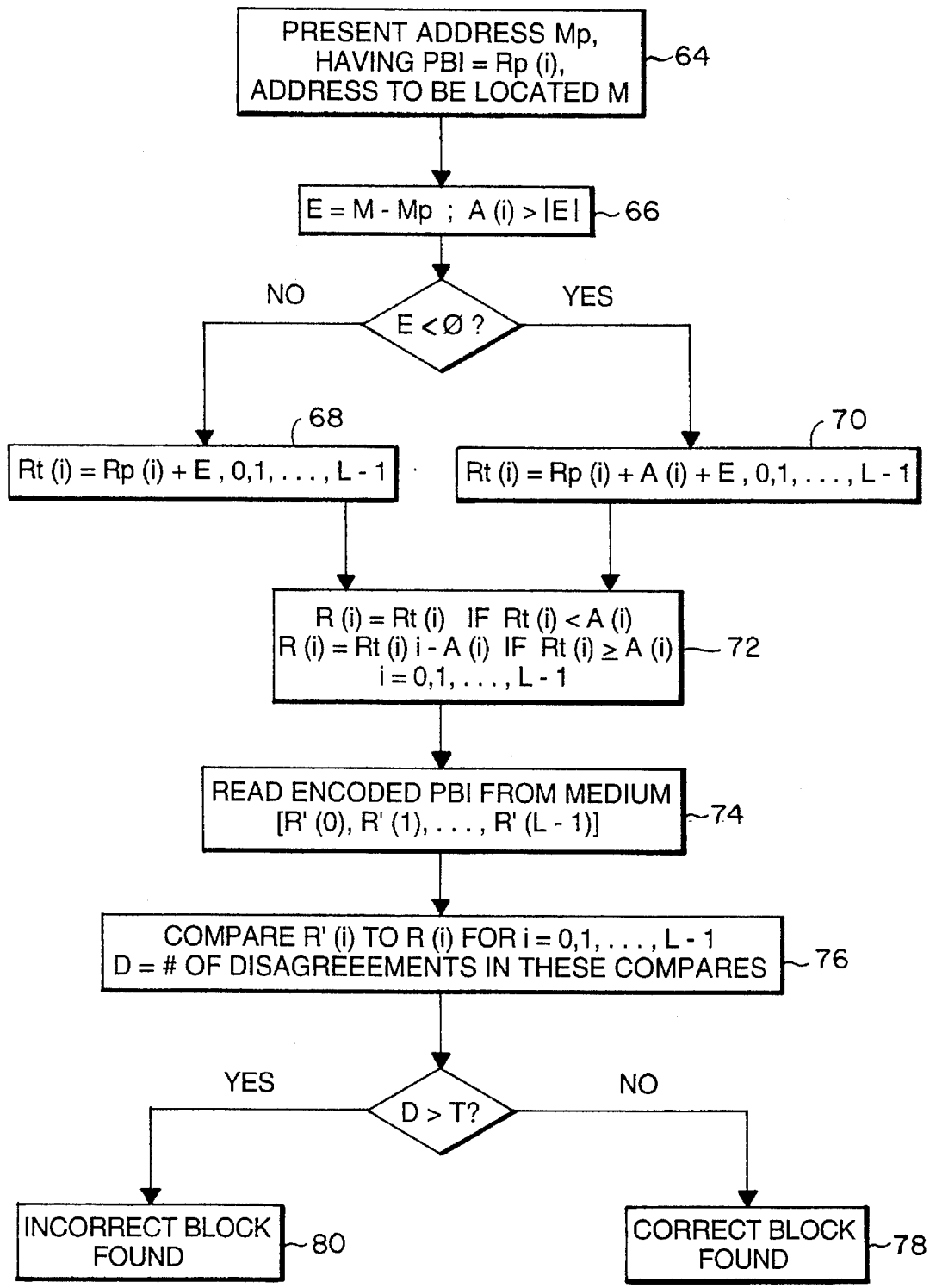
FIG. 4 is a flow diagram of a simpler method of reading a block from a disk when the physical block identification word of a nearby block is known and within a certain distance from the block being seeked.

In either case, no divisions are necessary. Therefore, for the cases that A(i)>|E| for all values of i, the PBI verification process can be simplified as shown in the flow diagram of FIG. 4. For example:

Given a present physical address Mp=5=[5,5,0,5] and next physical address M=12=[5,1,2,12], compute E=M−Mp=7 (66).

If (E≧0) Rt(i)=Rp(i)+E; (68) thus Mt=[12, 12, 7, 12].

If (E<0) Rt(i)=Rp(i)+A(i)+E; (70) R(i)=Rt(i) if Rt(i)<A(i); thus R(3)=12

R(i)=Rt(i)−A(i) if Rt(i)≧A(i). (72) thus R(0)=5; R(1)=1; R(2)=2.

The encoded PBI is then read from the disk (74), and the remainders R'(i) are compared with R(i) for i=0, 1, ... ,L−1. (76) The number of disagreements D in the comparison is compared to a threshold T. If D is less than or equal to T, the correct PBI has been found (78). If D is greater than T, an incorrect PBI is declared (80). This process thus provides a divisionless method of determining the remainders of a physical address to be seeked in order to compare them to the remainders actually read, provided the address seeked is no farther away than the smallest A(i) used.

Figure 5:
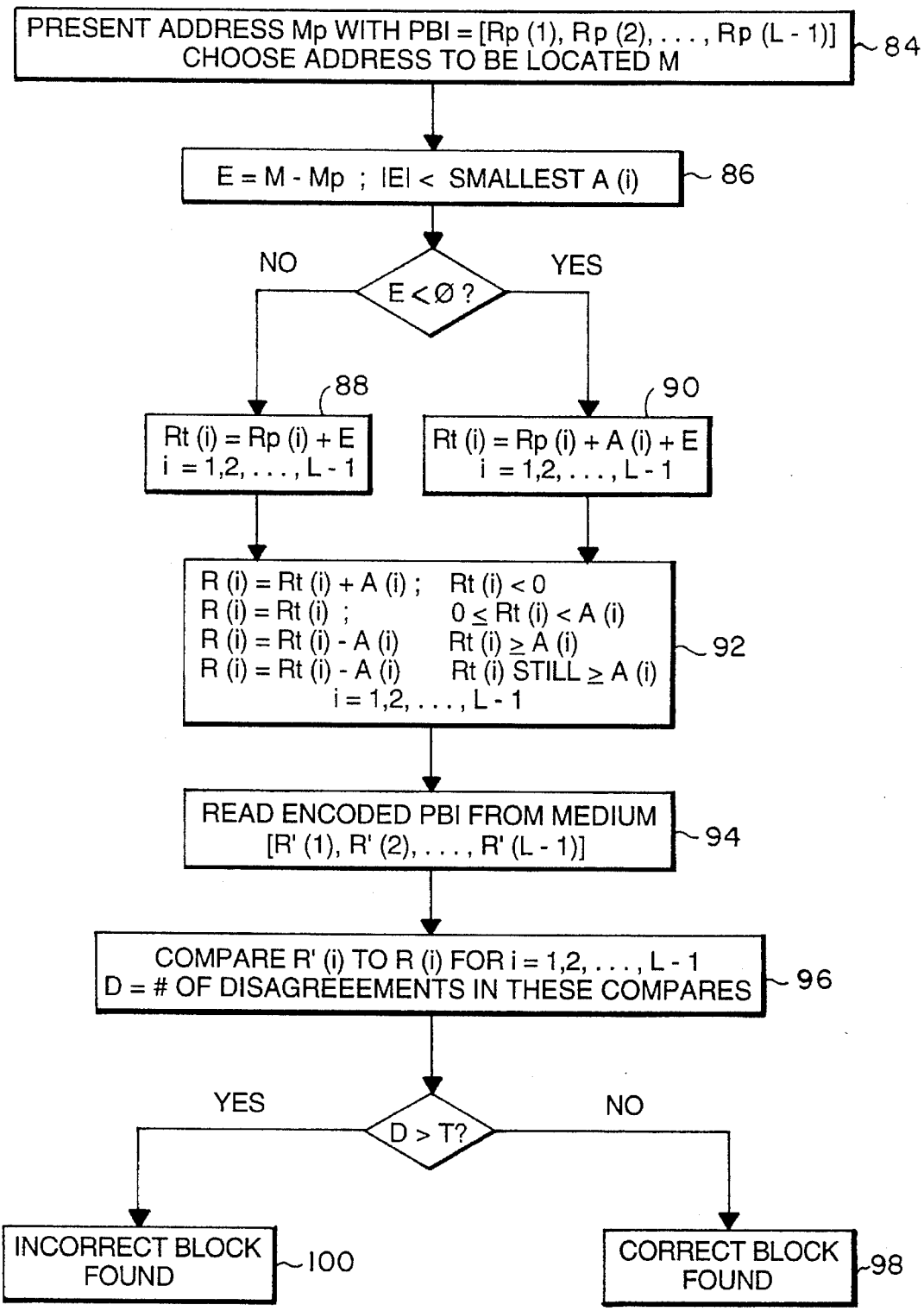
FIG. 5 is a flow diagram of a simpler method of reading a block from a disk using fewer elements of the physical block identification word when the physical block identification word of a nearby block is known and within a certain distance from the block being seeked.

According to another aspect of the invention, there is provided a more efficient way of computing the remainders R(i) for a given physical address M. In the previous examples all the factors A(i) of M have been used to compute the remainder R(i) for i=0,1, ... ,L−1. Let A(0) be the smallest factor among A(i)'s, so A=A(0)*A'. Then A' may be used instead of A in computing the remainders A(1),A(2), ... ,A(L−1). The possible PBI can now be extended from A' to A. This approach has the further advantage of using no division if A(0) is a small number such as two, three, four, etc. The flow chart of FIG. 5 sets forth an example of this approach using A(0)=2 and assumes the absolute value of the difference E between the present physical address and the physical address to be found is less than twice the smallest A(i) for i=1,2, ... ,L−1; that is, |E|<2*A(1)=10.

Accordingly, given a present physical address Mp having a present PBI

Mp=[Rp(1),Rp(2), ... ,Rp(L−1)]

and a next physical address M having a next PBI

M=[R(1),R(2), ... ,R(L−1)], (84)

compute E=M−Mp (86). If E is positive Rt(i)=Rp(i)+E (88), and if E is negative Rt(i)=Rp(i)+A(i)+E (90).

Then R(i) is calculated for i=1,2, ... ,L−1 as:

R(i)=Rt(i)+A(i) if Rt<0;

R(i)=Rt(i) if 0<Rt(i)<A(i)

R(i)=Rt(i)−A(i) if Rt(t)≧A(i)

R(i)=Rt(i)−A(i) if Rt(t)≧A(i). (92)

The encoded PBI R'(i) is then read (94) and compared with R(i) for i=1,2, ... ,L−1 (96). If the number of disagreements D is less or equal to the threshold T, the correct PBI has been found (98). If D is greater than the threshold T, an incorrect PBI is declared (100).

For example, given A(0)=2, A(1)=5, A(2)=7, and A(3)=11, and given a present physical address of 5, PBI Mp=[Rp(1), Rp(2), Rp(3)]=[0,5,5]. Find the PBI for physical address M=12. E=M−Mp=12−5=7, which is less than A(0)*A(1)=10, so the algorithm can be used. E is positive, so Rt(i)=Rp(i)+E, Mt=[7, 12, 12]. R(i)=Rt(i)−A(i), so M=[2, 5, 1]. All R(i) are less than A(i), so no second subtraction is required. Looking back to Table I., it can be seen that the portion of the PBI=[R(1), R(2), R(3)] for physical address 12 is indeed [2, 5, 1].

In the above, if A(0) has been 3 rather than 2, the range of |E| would be extended to 3*A(i), but an extra subtraction may be necessary to obtain a given R(i). In general, the range of |E| can be extended to A(0)*A(i). By proper choice of A(0), which is not used explicitly in computing R(i), the flexibility of selecting the factors A(1), ... ,A(L−1) increases significantly for a maximum value of |E|. However, a large value of A(0) involves too many subtractions to obtain the values R(i), and thus loses any efficiency advantage over the straightforward modulo computation. Thus, it is important to keep A(0) small if A(0) is to be used as a "hidden" modulo.

A further speed of computation advantage is obtained from realizing that the remainder r=M mod A(i) can be obtained from r' and q', where r' and q' satisfy the following equation:

$$M=q'*[A(i)+j]+r' \text{ for } r'<A(i)+j$$

In other words, the remainder of M mod A(i) is the same as the remainder of M'=q'*j+r' which is much smaller than the value M itself.

Figure 6:
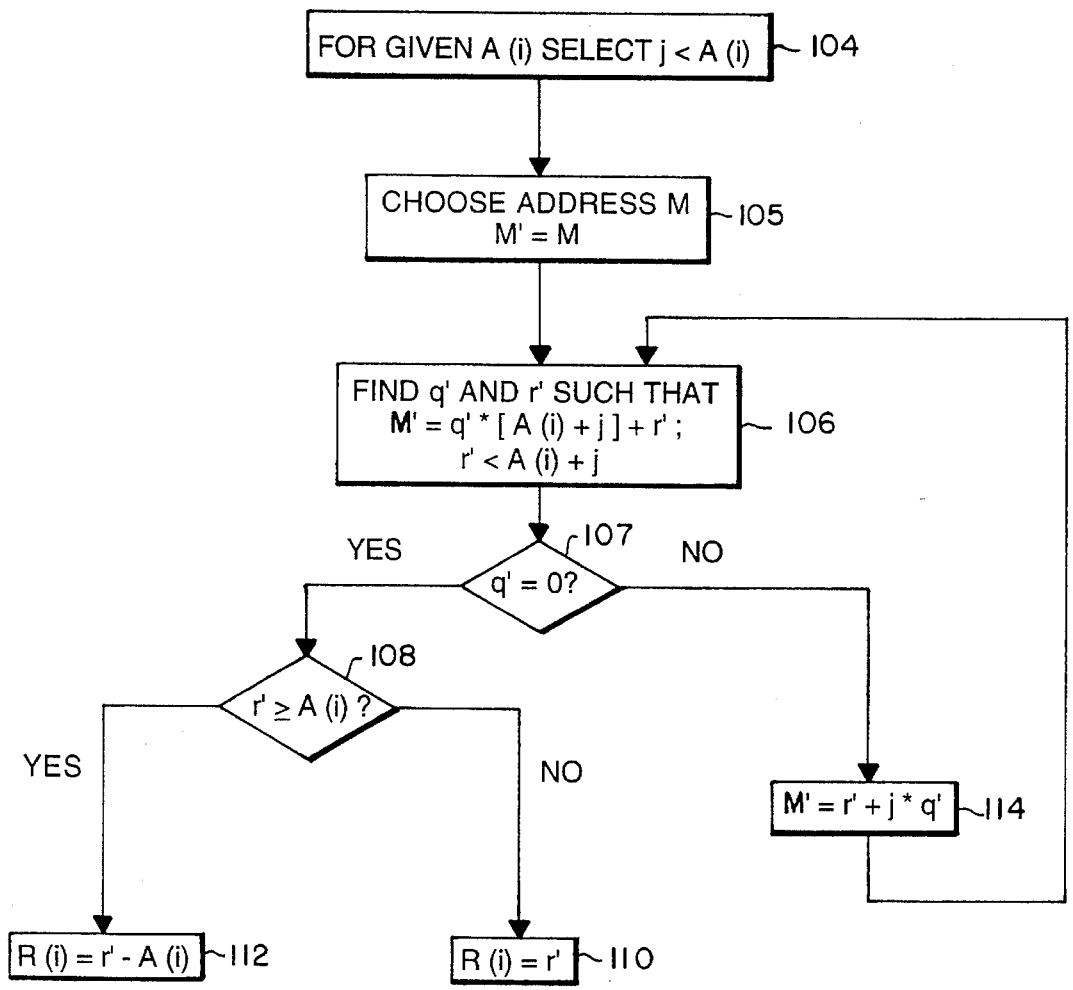
FIG. 6 is a flow diagram of a method of determining the remainder R(i) for the function M mod A(i)

Referring to the flow diagram of FIG. 6, the value of q'*j+r' is treated as M' and repeated until the quotient q'=0. j is selected to be less than A(j). When q' is zero, the value r' is either the remainder r or the remainder r+A(j).

Thus, for a given A(i), a j<A(i) is selected. (104) Starting with M (105), find q' and r' such that M'=q'*[A(i)+j]+r'; r'<A(i)+j. (106)

If q'=0 (107), then r' is compared to A(i) (108). If r' is less than A(i), r'=r (110); else, r=r'−A(i) (112). If q' is not equal to 0, a new M'=r'+j*q' and the process is repeated (114).

For example, referring to Table I., given a physical address M=19, find M mod A(0).

M'=19=2*(7+1)+3; thus q'=2, r'=3, j=1.

q' is not equal to 0.

M'=q'*j+r'; so M'=1*2+3=5.

5=0*(7+1)+5; q'=0, so r=r'=5.

As can be seen from Table I., 19 mod 7 is indeed 5.

Figure 7:
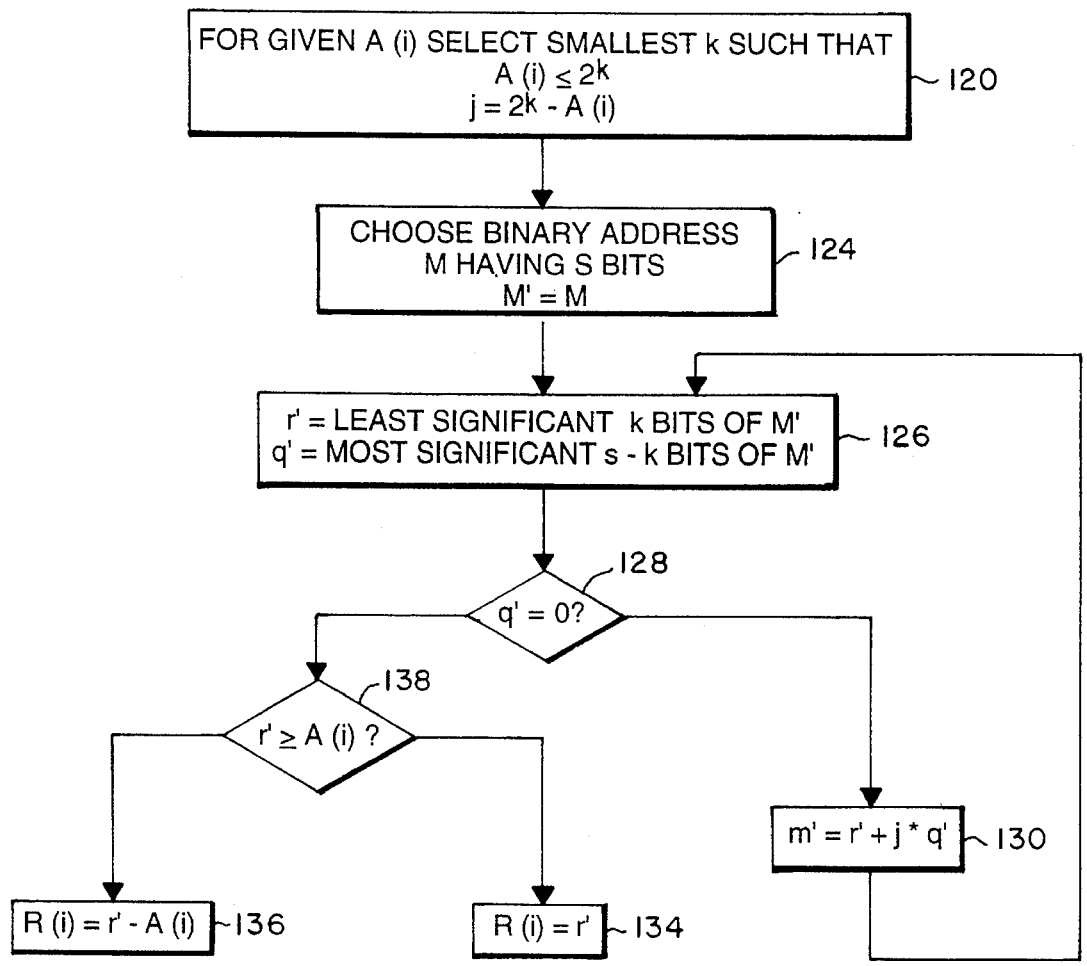
FIG. 7 is a flow diagram of a simplified method of determining the remainder R(i) for the function M mod A(i) where M is represented as a binary number.

A further savings comes in choosing the correct value of A(i)+j so that a division operation is avoided. The choice of A(i)+j=2^k (where 2^k signifies "2 to the power of k") can avoid the division operation completely in the binary representation of numbers. This is because for M' containing s bits:

M'=q'*2^k+r'; r'<2^k;

r'=the least significant k bits of M' and q'=the most significant s-k bits of M'.

r can now be computed without division according to the process shown in the flow chart of FIG. 7. The step M'=r'+j*q' in the flow chart can be performed by add and shift operations because any integer j can be expressed as a sum of powers of two. Thus M' can be computed as r' plus the summation of various shifts of q'. This is especially simple if j is a very small integer which can be expressed as a sum of very few powers of two. The process shown in the flow chart is demonstrated by example:

Find M=289 mod 11.

A(i)=11. Select the smallest k such that 2^k≧A(i) results in k=4. Therefore j=2^4−A(i)=16−11=5. The integer 5 is decomposed into 2^0+2^2. (120)

note that 2^2 can be calculated by merely shifting left 2 bits. Thus j*q'=q'(1+2^2)=q'+left-shift-2-bits-of-q'.
Iteration 1:

q' is not zero. (128)

Iteration 2:

$$M' = r' + j*q' \quad (130)$$
$$= r' + q' + \text{left-shift-2-bits-of-}q'$$
$$= (00000\ 0001)_2 + (00001\ 0010)_2 + (00100\ 1000)_2$$
$$= (00101\ 1011)_2$$
$$r' = (00000\ 1011)_2 \quad (126)$$
$$q' = (00000\ 0101)_2$$
$$q' \text{ is not zero.} \quad (128)$$

Iteration 3:

$$M' = r' + q' + \text{left-shift-2-bits-of-}q' \quad (130)$$
$$= (00000\ 1011)_2 + (00000\ 0101)_2 + (00001\ 0100)_2$$
$$= (00010\ 0100)_2$$
$$r' = (00000\ 0100)_2 \quad (126)$$
$$q' = (00000\ 0010)_2$$
$$q' \text{ is not zero.} \quad (128)$$

Iteration 4:

$$M' = r' + q' + \text{left-shift-2-bits-of-}q' \quad (130)$$
$$= (00000\ 0100)_2 + (00000\ 0010)_2 + (00000\ 1000)_2$$
$$= (00000\ 1110)_2$$
$$r' = (00000\ 1110)_2 \quad (126)$$
$$q' = 0. \quad (128)$$

Now r=r' (134) or r'−A(i) (136). Since r' is greater than A(i)=11 (138), $$r = r' - A(i) = (00000\ 1110)_2 - (00000\ 1011)_2$$
$$= (00000\ 0011)_2 = 3.$$

In the previously described example the PBI encodes a three dimensional physical address representing disk surface, track number, and sector for a data block or a group of data blocks on a hard disk. Alternatively, in hard disk drive applications it can be advantageous to encode the track number and sector address separately. It is important that radial positional information, i.e. track number information, be readable on the fly as the heads seek over the disk at high speeds (100+ inches per second). If an encoded track number takes too long to read while the head is moving at maximum velocity, then the information read will contain a mixture of track numbers from the multiple tracks crossed while reading during the seek operation. This problem is minimized by keeping the duration of the read short and providing reliable radial positional information.

Figure 8:
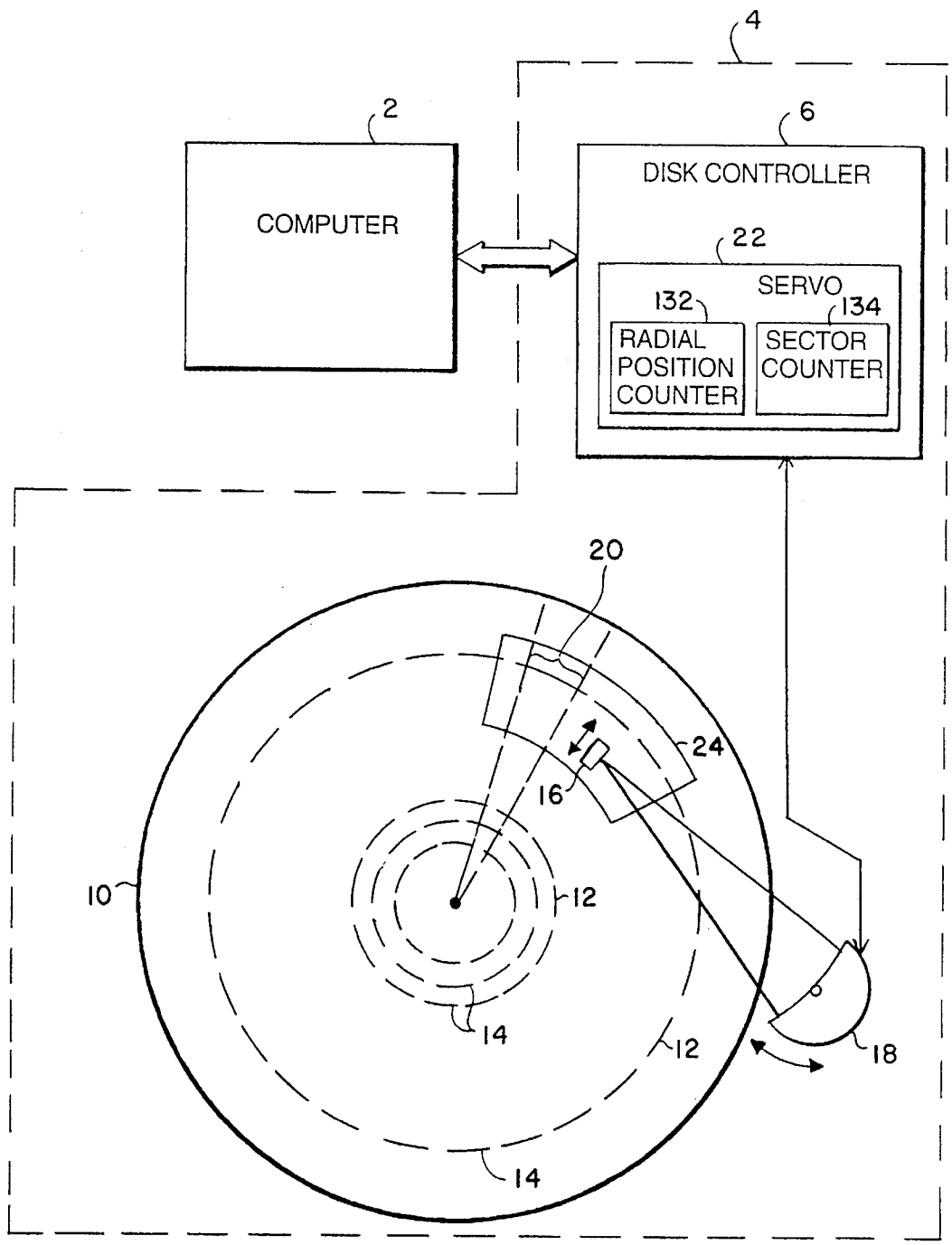
FIG. 8 is a representation of the disk drive of FIG. 1 showing the servo system in further detail.
Figure 8A:
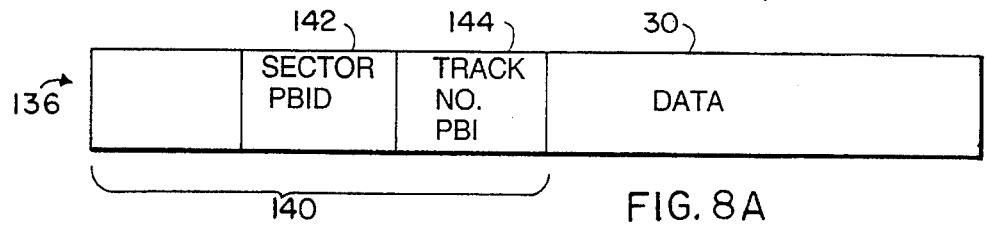
FIG. 8A represents the format of a data block for the disk drive of FIG. 8 according to another implementation.

In FIG. 8 there is shown the hard disk drive system of FIG. 1 where the servo system includes a radial position counter 132 used to locate a track during seeking, and a sector counter 134 for locating a physical sector position on a located track according to any of the method previously described. In FIG. 8a one possible format for a data block 136 on a track 138 is shown. The header 140 of the data block 136 includes a sector PBI 142 and a separate track number PBI 144.

The Chinese Remainder Theorem is applied to provide the track number PBI 144, thereby providing both a shortened data representation and redundancy during the shortened read period for radial positioning. In particular, for a disk surface including N tracks, assume d tracks can be crossed at once during a particular seek sample. If a sector header includes a track number ID field represented as N mod A(i) where A(i)>d, then N mod M will provide a unique distance—that is, N mod A(i) will give a unique number of tracks crossed within d tracks.

The track number PBI 144 and sector PBI 142 are each provided according to the method of FIG. 2. The methods of FIGS. 3–7 are then applied to determine radial position via the track number PBI 144. When the correct track number has been found, the process is repeated to find the correct sector via the sector PBI 142 according to the methods of FIGS. 3–7.

It is understood that the use of PBI's based on the Chinese Remainder Theorem can be advantageous as a means for uniquely identifying not only single data blocks on a medium, but also groups of data blocks. For example, it is known in the disk drive art that physical identification fields may correspond to more than one physical block. According to such implementations, a physical identification field identifies a group of blocks, a single block being further identified by monitoring the time differential between the location of the physical identification field as it passes under the head and the relative expected location of the single block as determined by the disk rotation speed and the radial location of the group of blocks. It is clear that PBI's provided according to the principles of the invention can uniquely identify not only individual blocks but groups of blocks in a like manner. Thus, referring back to FIG. 8A, it is understood that alternate embodiments could provided one header 140 including a sector PBI 142 and a track number PBI 144, the header 140 being associated with a plurality of data blocks.

According to a different aspect of the invention, if the magnitude of a given remainder is sufficient, the seek direction and velocity can be determined by the changes read in the adjacent remainders. In particular, at least one A(i) must be greater than 2*d, d again being the maximum number of tracks crossed during any seek sample.

Figure 9:
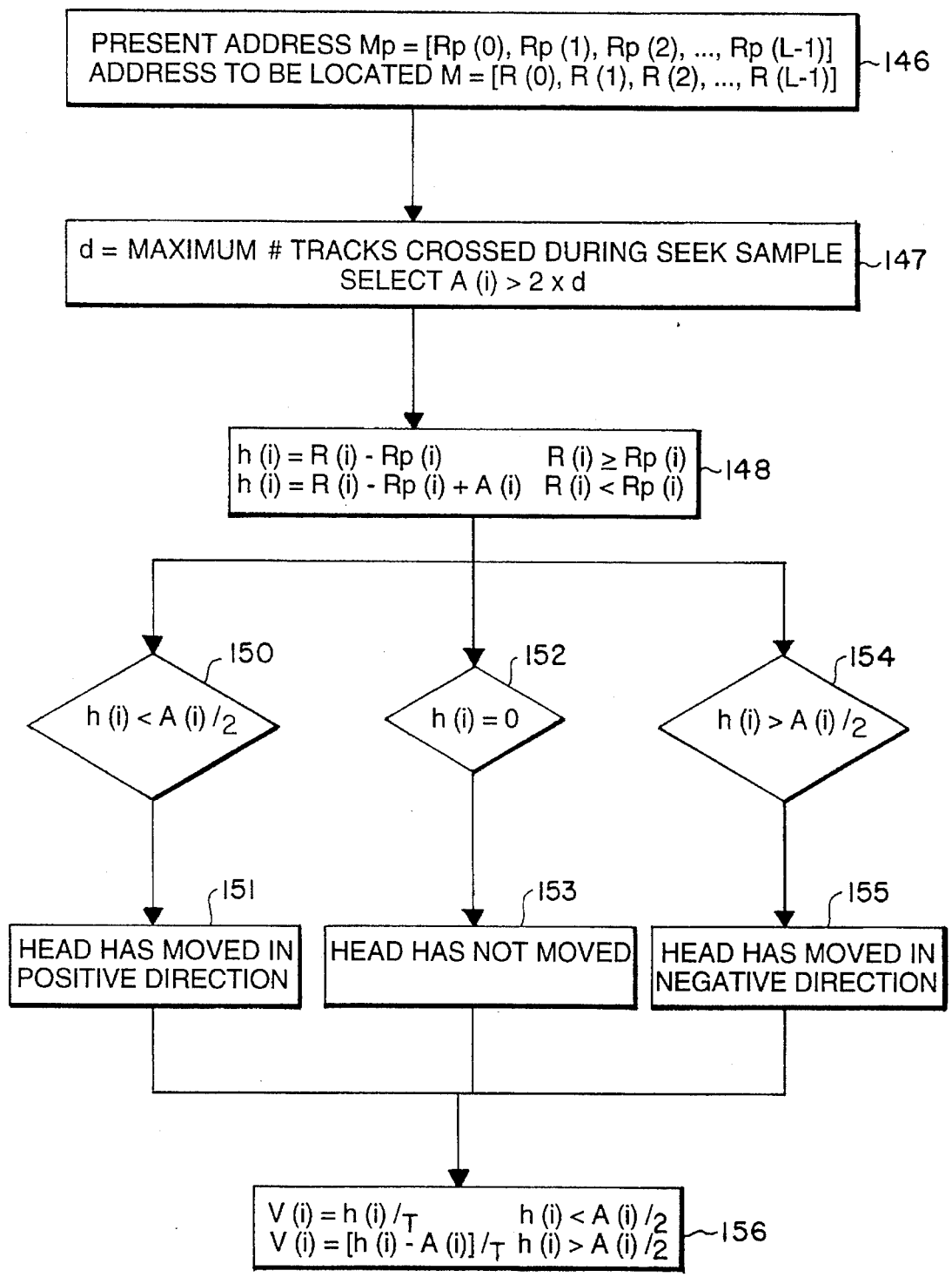
FIG. 9 is a flow diagram of a method of determining the direction and velocity of the magnetic heads of the disk drive of FIG. 1 during track seeking.

For example, referring back to Table I, let the column "Integer ID" represent a track location N. Referring also to FIG. 9, given a present physical radial or track location $$M_p = [R_p(0), R_p(1), \ldots, R_p(L-1)]$$

and a next physical track location $$M = [R(0), R(1), \ldots, R(L-1)] \quad (146)$$

and given the moduli A(0), A(1), ..., A(L−1), select an A(i) such that A(i)>2d, where d is the maximum number of tracks the head can move between two radial track samplings (147). To determine the direction of head movement, compute the following:

h(i)=R(i)−Rp(i) if R(i)≧Rp(i);

h(i)=R(i)−Rp(i)+A(i) if R(i)<Rp(i). (148)

Then, if h(i)<A(i)/2, the head has moved in one direction—i.e. a positive direction. (150), (151)

If h(i)=0, the head has not moved. (152), (153)

If h(i)>A(i)/2, the head has moved in the opposite direction—i.e. a negative direction. (154), (155)

For example, given A(0)=7, A(1)=11, A(2)=5, and A(3)=13 as in Table I, if the maximum number of tracks crossed during a seek sample is 4, i.e. d=4, then A(1) and A(3) may be used to compute the direction of head movement since they are both greater than 2*d=8. For the following example A(1) will be used. Given $$M_p = [4, 0, 1, 11]$$

$$M = [2, 9, 4, 9]$$

then

Rp(1)=0;
R(1)=9;
A(1)/2=11/2=5.5;
h(1)=R(1)−Rp(1)=9−0=9>A(1)/2; therefore, the head moves in the negative direction. If, for example, A(3)= 13 is used, then
Rp(3)=11;
R(3)=9;
A(3)/2=13/2=6.5;
h(3)=R(3)−Rp(3)+A(3)=9−11+13=11>A(3)/2; again, the head moves in the negative direction.

Consider now moving in the opposite direction so that
Mp=[4, 0, 1, 11]
M=[6, 2, 3, 0].
Using A(1),
Rp(1)=0;
R(1)=2;
A(1)/2=11/2=5.5;
h(1)=R(1)−Rp(1)=2−0=2<A(1)/2; therefore, the head has moved in the opposite, positive direction. The same result is obtained if using A(3)=13.

Knowing the value of h(i) and given the time interval T between two samplings, the velocity V of the head movement can then be computed as V(i)=h(i)/T if h(i)<A(i)/2;

V(i)=[h(i)−A(i)]/T if h(i)>A(i)/2. (156)

Thus, if T=20 milliseconds, then the velocity V for the above example is

V(1)=[h(1)−A(1)]/T=−2/0.02=−100 tracks per second, the minus sign indicating the negative direction of movement.

The physical block identification word according to the invention provides many advantages. First, the number of bits required to store the PBI is relatively small; in fact, in the examples previously described, a very small increase in media space is required over that which would be required to store a physical address with no redundancy or ECC. The small size of the PBI is highly advantageous in applications such as the previously described hard disk drive, where the speed at which information can be accurately read falls as the length of the information to be read increases.

An advantageous embodiment can provide a further reduction in size of the PBI by realizing that for each given remainder representation A(i), not all possible binary combinations are used. For instance, referring back to Table I., R(0)=M MOD A(0) requires 3 bits to represent the possible values 0–6 in standard binary format—however, the combinations of the three bits representing the value 7 is not used. Likewise, the combinations of the four bits representing the values 11–15 are not used to represent R(1)=M MOD A(1), which ranges from 0 to 10. It becomes apparent that a further encoding of the PBI can provide a PBI with even fewer bits than the PBI represented as separate binary remainder values by compressing out the values not used.

The PBI according to the invention also provides robust fault tolerance, since the correct information can be identified despite the corruption of part of the PBI, and the threshold defining the number of defects allowed in a correct PBI can be adjusted based on the expected media error rate. Finally, the PBI method according to the invention may be implemented either in the device software or firmware or in the device hardware.

The principles of the invention are easily adapted for use in any environment requiring the unique identification of data blocks within a data stream, such as a bus or network, or on a medium, the various media including but not limited to: magnetic disk, tape, optical disk, and solid state storage systems. Any information M corresponding to a unique characteristic of a data block can be encoded according to the previously described methods to provide a PBI for storage in a unique identification field of the data block.

Figure 10:
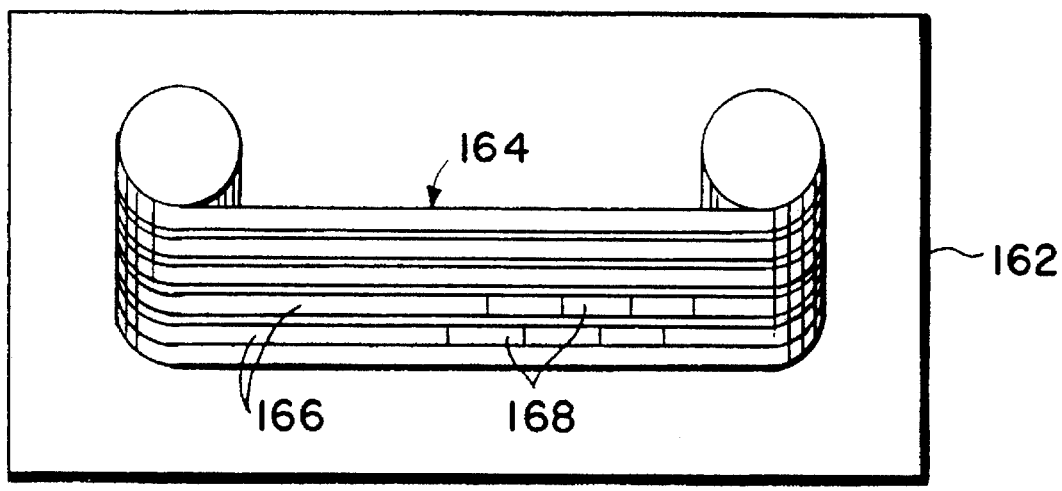
FIG. 10 is a representation of a tape drive including a tape on which data blocks are uniquely identified according to the principles of the invention.
Figure 10A:
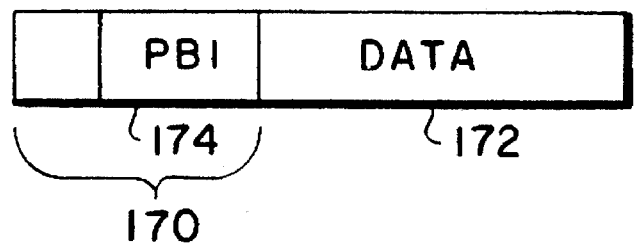
FIG. 10A represents the format of a data block for the tape drive of FIG. 9 according to one possible implementation.

Referring for example to FIG. 10, there is shown a tape drive 162 including a tape 164 on which tracks of data 166 are stored. Data blocks 168 reside on the tracks 166. As shown in FIG. 10A, each data block 168 includes a header section 170 and a data section 172. The header section 170 includes a PBI 174, within which the track number and block address of the data block 168 is encoded and used according to the methods previously described.

Figure 11:
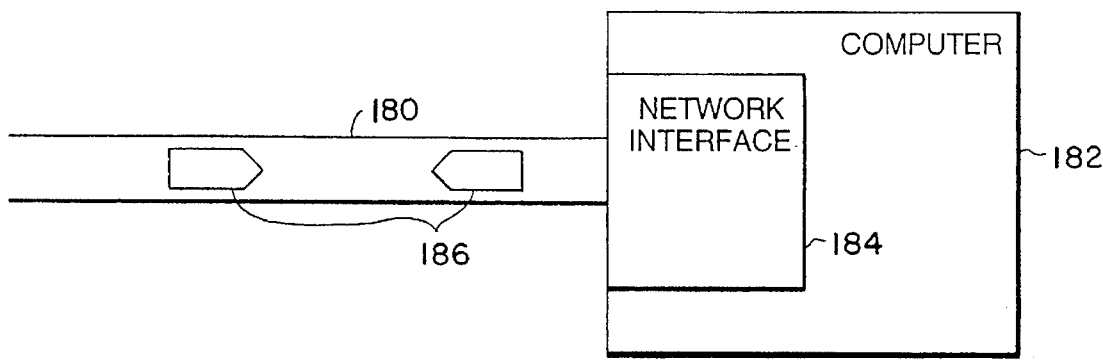
FIG. 11 is a representation of a computer system coupled to a network over which data packets are transferred, the data packets including unique identification fields according to the principles of the invention.
Figure 11A:
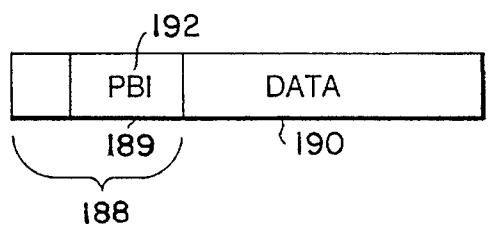
FIG. 11A represents the format of a packet for transfer over the network of FIG. 11 according to one possible implementation.

In addition, referring to FIG. 11, there is shown a network 180 to which a computer 182 is coupled via a network interface 184. The network interface 184 transfers packets of information 186 via the network 180 to other computers or peripheral devices such as disk drives (not shown). As shown in FIG. 11A, The packet of information 186 includes a header section 188 and a data section 190. Within the header section 188 is a unique identification field 189. The unique identification field 189 is a PBI 192 which is encoded packet sequencing information. Alternatively, the PBI 192 can be used to represent various other unique characteristics of a packet 186 within a data stream for which it is desirable to provide a fast and fault tolerant identification; for example, node ID information, password information, or command queue tags.

It is apparent that, within the scope of the invention, modifications and different arrangements may be made other than as herein disclosed. The present disclosure is merely illustrative, the invention comprehending all variations thereof.

What is claimed is:

1. A method for storing unique data groups on a hard disk comprising the steps of:

a. supplying a data group having associated with it unique identification fields;

b. providing a plurality of integer moduli which are relative prime in pairs;

c. encoding radial position information corresponding to a track on which the data group resides on the medium by:

producing a radial physical block identification word comprising the integer remainders resulting from dividing the radial position information by each integer moduli;

storing the physical block identification word in a unique identification field associated with the data group;

d. encoding sector position information corresponding to the sector on the track on which the data group resides by:

producing a sector physical block identification word comprising the integer remainders resulting from dividing the sector position information by each integer moduli;

storing the sector physical block identification word in another unique identification field associated with the data group; and e. storing the unique identification fields and the data group on the disk.

2. A method for storing unique data blocks on a hard disk comprising the steps of:

a. supplying a data block including unique identification fields;

b. providing a plurality of integer moduli which are relative prime in pairs;

c. encoding radial position information corresponding to a track on which the block resides on the medium by:
   producing a radial physical block identification word comprising the integer remainders resulting from dividing the radial position information by each integer moduli;
   storing the physical block identification word in a unique identification field of the block;

d. encoding sector position information corresponding to the sector on the track on which the block resides by:
   producing a sector physical block identification word comprising the integer remainders resulting from dividing the sector position information by each integer moduli;
   storing the sector physical block identification word in another unique identification field of the block; and e. storing the block on the disk.

3. A method for storing unique data groups on a data medium comprising the steps of:

a. encoding information M representing a unique characteristic of a data group wherein the data group has associated with it a unique identification field by:
   providing a plurality of integer moduli [A(0),A(1), ... ,A(L−1)], the integer moduli being relatively prime in pairs:
   producing a physical block identification word comprising remainders [R(0),R(1), ... ,R(L−1)], wherein R(i)=M MOD A(i) for i=(0,1, ... ,L−1);

b. storing the physical block identification word in the unique identification field associated with the data group; and wherein the step of producing a physical block identification word comprises the steps of:

for each A(i),
   selecting j<A(i);
   M'=information M;
   repeating until q'=0:
      find q' and r' such that M'=q'*[A(i)+j]+r', with r'<A(i)+j;
      M'=r'+j*q';
   when q'=0, then
      if r'≧A(i) then R(i)=r'−A(i);
      if r'<A(i) then R(i)=r'.

4. A method for storing unique data groups on a data medium comprising the steps of:

a. encoding information M representing a unique characteristic of a data group wherein the data groups has associated with it a unique identification field by:
   providing a plurality of integer moduli [A(0),A(1), ... ,A(L−1)], the integer moduli being relatively prime in pairs:
   producing a physical block identification word comprising remainders [R(0),R(1), ... ,R(L−1)], wherein R(i)=M MOD A(i) for i=(0,1, ... ,L−1);

b. storing the physical block identification word in the unique identification field associated with the data group: and wherein the step of producing a physical block identification word comprises the steps of:

for each A(i),
   selecting the smallest k such that $A(i) \geq 2^k$;
   $j=2^k-A(i)$;
   M'=a binary representation of information M of s bits;
   repeating until q'=0:
      r'=the least significant k bits of M';
      q'=the the most significant s-k bits of M';
      M'=r'+j*q';
   when q'=0, then
      if r'≧A(i) then R(i)=r'−A(i);
      if r'<A(i) then R(i)=r'.

5. A method of identifying unique data groups within a data stream comprising the steps of:

choosing information M representing a unique characteristic of a data group to be identified;

producing an expected physical block identification word comprising the remainders [R(0),R(1), ... ,R(L−1)] wherein R(i)=M MOD A(i) for i=(0,1, ... ,L−1), [A(0),A(1), ... ,A(L−1)] being integer moduli which are relative prime in pairs;

comparing the expected physical block identification word [R(0),R(1), ... ,R(L−1)] to a physical block identification word [R'(0),R'(1), ... ,R'(L−1)] associated with a data group in the data stream;

declaring the data group associated with the physical block identification word [R'(0),R'(1), ... ,R'(L−1)] as the data group to be identified if the comparison results in a number of remainders which differ by less than or equal to a threshold number of remainders; and declaring the data group associated with the physical block identification word R' as not being the data group to be identified if the comparison results in a number of remainders which differ by more than a threshold number of remainders.

6. The method of claim 5 wherein the step of choosing information M chooses information M representing a unique characteristic of a data group containing a single data block.

7. The method of claim 5 wherein the step of choosing information M chooses information M representing a unique characteristic of a data group containing a plurality of data blocks.

8. The method of claim 5 wherein the step of choosing information M chooses information M which is a physical address of the data group to be identified.

9. The method of claim 5 further comprising the step of:

providing information Mp representing a unique characteristic of a presently identified data group associated with a unique identification field including a physical block identification word [Rp(0),Rp(1), ... ,Rp(L−1)];

and wherein the step of producing an expected physical block identification word [R(0),R(1), ... ,R(L−1)] further comprises the steps of:

determining the difference E in location between the presently identified data group and the data group to be identified by subtracting the information Mp from the information M;

verifying that the absolute value of the difference E is less than the smallest moduli A(i) for i=0,1, ... ,L−1;

if the difference E is negative, producing temporary remainders [Rt(0),Rt(1), ... ,Rt(L−1)] by adding to each of the remainders Rp(i) of the physical block identification word associated with the presently identified data group the difference E and the corresponding moduli A(i) for i=0,1, ... ,L−1;

if the difference E is positive, producing temporary remainders [Rt(0),Rt(1), ... ,Rt(L−1)] by adding to each of the remainders Rp(i) of the physical block identification word associated with the presently identified data group the difference E for i=0,1, ... ,L−1; and producing a physical block identification word [R(0), R(1), . . . ,R(L−1)] for the data group to be identified, wherein for i=0,1, . . . ,L−1 each said remainder R(i) is equal to the corresponding temporary remainder Rt(i) if said temporary remainder Rt(i) is less than the corresponding moduli A(i), and each said remainder R(i) is equal to the corresponding temporary remainder Rt(i) minus the corresponding moduli A(i) if the temporary remainder Rt(i) is greater than or equal to the corresponding moduli.

10. The method of claim 9 wherein the step of providing information Mp provides information Mp which is a physical address of the presently identified data group.

11. The method of claim 5 wherein the step of producing a physical block identification word comprising the remainders [R(0),R(1), . . . ,R(L−1)], wherein R(i)=M MOD A(i) for i=(0,1, . . . ,L−1), comprises the steps of:

for each A(i),
  select j<A(i);
  M'=information M;
  repeating until q'=0:
    find q' and r' such that M'=q'*[A(i)+j]+r', with r'<A(i)+j;
    M'=r'+j*q';
  when q'=0, then
    if r'≧A(i) then R(i)=r'−A(i);
    if r'<A(i) then R(i)=r'.

12. The method of claim 5 wherein information M is binary information and the step of producing a physical block identification word comprising the remainders [R(0), R(1), . . . ,R(L−1)], wherein R(i)=M MOD A(i) for i=(0,1 . . . ,L−1), comprises the steps of:

for each A(i),
  selecting the smallest k such that A(i)≦2^k;
  j=2^k−A(i);
  M'=binary information M of s bits;
  repeating until q'=0:
    r'=the least significant k bits of M';
    q'=the most significant s-k bits of M';
    M'=r'+j*q';
  when q'=0 then
    if r'≧A(i) then R(i)=r'−A(i);
    if r'<A(i) then R(i)=r'.

13. A method of identifying unique data groups within a data stream comprising the steps of:

choosing information M representing a unique characteristic of a data group to be identified;

providing information Mp representing a unique characteristic of a presently identified data group having associated with it a physical block identification word [Rp(0),Rp(1), . . . ,Rp(L−1)];

determining the difference E in location between the presently identified data group and the data group to be identified by subtracting the physical position information Mp from the physical position information M;

for all moduli A(i)=A(0),A(1), . . . ,A(L−1, letting A(0) be the smallest moduli for all A(i), verifying that the absolute value of the difference E is less than A(0) times the smallest moduli A(i) for i=1, . . . ,L−1;

if the difference E is negative, producing temporary remainders [Rt(1),Rt(2), . . . ,Rt(L−1)] by adding to each of the remainders Rp(i) of the physical block identification word associated with the presently identified data group the difference E and the corresponding moduli A(i) for i=1,2, . . . ,L−1;

if the difference E is positive, producing temporary remainders [Rt(1),Rt(2), . . . ,Rt(L−1)] by adding to each of the remainders Rp(i) of the physical block identification word associated with presently identified data group the difference E for i=1,2, . . . ,L−1; and producing a physical block identification word [R(1), R(2), . . . ,R(L−1)] for the data group to be identified, wherein for i=1,2, . . . ,L−1:

R(i)=Rt(i)+A(i) if Rt(i)<0;

R(i)=Rt(i) if 0≧Rt(i)<A(i);

R(i)=Rt(i)−A(i) if Rt(i)≦A(i), wherein this step is repeated up to A(0) times until Rt(i) is less than A(i);

comparing the remainders in the expected physical block identification word [R(1),R(2), . . . ,R(L−1)] to the remainders [R'(1),R'(2), . . . ,R'(L−1)] of a physical block identification word associated with a data group in the data stream;

declaring the data group associated with the remainders [R'(1),R'(1), . . . ,R'(L−1)] of the physical block identification word in the data stream as the data group to be identified if the comparison results in a number of remainders which differ by less than or equal to a threshold number of remainders; and declaring the data group associated with the remainders [R'(1),R'(1), . . . ,R'(L−1)] of the physical block identification word in the data stream as not being the data group to be identified if the comparison results in a number of remainders which differ by more than a threshold number of remainders.

14. The method of claim 13 wherein the step of choosing information M chooses information M representing a unique characteristic of a data group to be identified containing a single data block, and wherein the step of providing information Mp provides information Mp representing a unique characteristic of a presently identified data group containing a single data block.

15. The method of claim 13 wherein the step of choosing information M chooses information M representing a unique characteristic of a data group to be identified containing a plurality of data blocks, and wherein the step of providing information Mp provides information Mp representing a unique characteristic of a presently identified data group containing a plurality of data blocks.

16. The method of claim 13 wherein the step of providing information Mp provides information Mp which is a physical address of the presently identified data group.

17. A method of locating data groups on a data medium comprising the steps of:

choosing a physical address M of a data group to be located wherein the data group to be located has associated with it a unique identification field;

producing an expected physical block identification word comprising the remainders [R(0),R(1), . . . ,R(L−1)] wherein R(i)=M MOD A(i) for i=0,1, . . . ,L−1, [A(0),A(1), . . . ,A(L−1)] being integer moduli which are relative prime in pairs;

reading from the medium a physical block identification word [R'(0),R'(1), . . . ,R'(L−1)] from the unique identification field associated with the data group to be located;

comparing the remainders [R'(0),R'(1), . . . ,R'(L−1)] in the physical block identification word read to the remainders [R(0),R(1), . . . ,R(L−1)] in the expected physical block identification word;

identifying the data group associated with the physical block identification word [R'(0),R'(1), . . . ,R'(L−1)] as the data group to be located if the comparison results in a number of remainders which differ by less than or equal to a threshold number of remainders; and identifying the data group associated with physical block identification word [R'(0),R'(1), . . . ,R'(L–1)] as not being the data group to be located if the comparison results in a number of remainders which differ by more than a threshold number of remainders.

18. The method of claim 17 wherein the data group to be located is spaced on the medium from a present data group, the present data group having a physical address Mp and being associated with a unique identification field containing a physical block identification word [Rp(0),Rp(1), . . . ,Rp(L–1)], and wherein the step of producing an expected physical block identification word M=[R(0),R(1), . . . ,R(L–1)] comprises the steps of:

determining the difference E in location between the present data group and the data group to be located by subtracting the physical address Mp of the present data group from the physical address M of the data group to be located;

verifying that the absolute value of the difference E is less than the smallest moduli A(i) for i=0,1, . . . ,L–1;

if the difference E is negative, producing temporary remainders [Rt(0),Rt(1), . . . ,Rt(L–1)] by adding to each of the remainders Rp(i) of the physical block identification word associated with the present data group the difference E and the corresponding moduli A(i) for i=0,1, . . . ,L–1;

if the difference E is positive, producing temporary remainders [Rt(0),Rt(1), . . . ,Rt(L–1)] by adding to each of the remainders Rp(i) of the physical block identification word associated with the present data group the difference E for i=0,1, . . . ,L–1; and producing a physical block identification word [R(0), R(1), . . . ,R(L–1)] for the data group to be located, wherein for i=0,1, . . . ,L–1 each said remainder R(i) is equal to the corresponding temporary remainder Rt(i) if said temporary remainder Rt(i) is less than the corresponding moduli A(i), and each said remainder R(i) is equal to the corresponding temporary remainder Rt(i) minus the corresponding moduli A(i) if the temporary remainder Rt(i) is greater than or equal to the corresponding moduli.

19. The method of claim 17 wherein the step of producing a physical block identification word comprising the remainders [R(0),R(1), . . . ,R(L–1)], wherein R(i)=M MOD A(i) for i=0,1, . . . ,L–1, comprises the steps of:

for each A(i),
selecting j<A(i);
M'=physical position information M;
repeating until q'=0:
find q' and r' such that M'=q'*[A(i)+j]+r', with r'<A(i)+j;
M'=r'+j*q';
when q'=0, then
if r'≧A(i) then R(i)=r'–A(i);
if r'<A(i) then R(i)=r'.

20. The method of claim 17 wherein the step of producing a physical block identification word comprising the remainders [R(0),R(1), . . . ,R(L–1)], wherein R(i)=M MOD A(i) for i=0,1, . . . ,L–1, comprises the steps of:

for each A(i),
selecting the smallest k such that A(i)≦$2^k$;
j=$2^k$–A(i);
M'=binary physical position information M of s bits;
repeating until q'=0:

r'=the least significant k bits of M';
q'=the most significant s-k bits of M';
M'=r'+j*q';
when q'=0 then
if r'>=A(i) then R(i)=r'–A(i);
if r'<A(i) then R(i)=r'.

21. The method of claim 17 wherein the step of choosing a physical address M chooses a physical address M of a data group containing a single data block.

22. The method of claim 17 wherein the step of choosing a physical address M chooses a physical address M of a data group containing a plurality of data blocks.

23. The method of claim 17 wherein the step of choosing a physical address M chooses a physical address M representing the position of the data group on a track on a tape.

24. The method of claim 17 wherein the step of choosing a physical address M chooses a physical address M which is a radial track number representing a unique track on a disk.

25. The method of claim 17 wherein the step of choosing a physical address M chooses a physical address M which is a sector number representing a unique sector location on a track on a disk.

26. The method of claim 17 wherein the the step of choosing a physical address M chooses a physical address M representing a disk surface, track location, and sector location on a disk.

27. A method of locating data groups on a data medium comprising the steps of:

a. choosing a physical address M of a data group to be located, the data group to be located having associated with it a unique identification field, the data group to be located being spaced on the medium from a present data group, the present data group having a physical address Mp and being associated with a unique identification field including a physical block identification word [Rp(0),Rp(1), . . . ,Rp(L–1)];

b. producing an expected physical block identification word comprising the remainders [R(0),R(1), . . . ,R(L–1)] wherein R(i)=M MOD A(i) for i=0,1, . . . ,L–1, [A(0),A(1), . . . ,A(L–1)] being integer moduli which are relative prime in pairs, the step of producing an expected physical block identification word comprising the steps of:

determining the difference E in location between the present data group and the data group to be located by subtracting the physical address Mp of the present data group from the physical address M of the data group to be located;

for all moduli A(i)=A(0),A(1), . . . ,A(L–1), letting A(0) be the smallest moduli for all A(i), verifying that the absolute value of the difference E is less than A(0) times the smallest moduli A(i) for i=1, . . . ,L–1;

if the difference E is negative, producing temporary remainders [Rt(1),Rt(2), . . . ,Rt(L–1)] by adding to each of the remainders Rp(i) of the physical block identification word associated with the present data group the difference E and the corresponding moduli A(i) for i=1,2, . . . ,L–1;

if the difference E is positive, producing temporary remainders [Rt(1),Rt(2), . . . ,Rt(L–1)] by adding to each of the remainders Rp(i) of the physical block identification word associated with the present data group the difference E for i=1,2, . . . ,L–1; and producing a physical block identification word [R(1), R(2), . . . ,R(L–1)] for the data group to be located, wherein for i=1,2, . . . ,L–1:

R(i)=Rt(i)+A(i) if Rt(i)<0;

R(i)=Rt(i) if 0≤Rt(i)<A(i);

R(i)=Rt(i)−A(i) if Rt(i)≧A(i), wherein this step is repeated up to A(0) times until Rt(i) is less than A(i);

c. reading from the medium a physical block identification word [R'(1),R'(2), ... ,R'(L−1)] from the unique identification field associated with the data group to be located;

d. comparing the remainders [R'(1),R'(2), ... ,R'(L−1)] in the physical block identification word read to the remainders [R(1),R(2), ... ,R(L−1)] in the expected physical block identification word;

e. identifying the data group associated with physical block identification word [R'(1),R'(2), ... ,R'(L−1)] as the data group to be located if the comparison results in a number of remainders which differ by less than or equal to a threshold number of remainders; and f. identifying the data group associated with physical block identification word [R'(1),R'(2), ... ,R'(L−1)] as not being the data group to be located if the comparison results in a number of remainders which differ by more than a threshold number of remainders.

28. The method of claim 27 wherein the step of choosing a physical address M chooses a physical address M of a data group to be located containing a single data block, the data group to be located being spaced on the medium from a present data group containing a single data block.

29. The method of claim 27 wherein the step of choosing a physical address M chooses a physical address M of a data group to be located containing a plurality of data blocks, the data group to be located being spaced on the medium from a present data group containing a plurality of data blocks.

30. The method of claim 27 wherein the step of choosing a physical address M chooses a physical address M representing the position of the data group on a track on a tape.

31. The method of claim 27 wherein the step of choosing a physical address M chooses a physical address M which is a radial track number representing a unique track on a hard disk.

32. The method of claim 27 wherein the step of choosing a physical address M chooses a physical address M which is a sector number representing a unique sector location of the block on a track on a hard disk.

33. The method of claim 27 wherein the step of choosing a physical address M chooses a physical address M corresponding to a disk surface, radial track location, and sector location of the block on a hard disk.

34. A method of identifying unique data blocks within a data stream comprising the steps of:

choosing information M representing a unique characteristic of a block to be identified;

producing an expected physical block identification word comprising the remainders [R(0),R(1), ... ,R(L−1)] wherein R(i)=M MOD A(i) for i=(0,1, ... ,L−1), [A(0),A(1), ... ,A(L−1)] being integer moduli which are relative prime in pairs;

comparing the expected physical block identification word [R(0),R(1), ... ,R(L−1)] to a physical block identification word [R'(0),R'(1), ... ,R'(L−1)] stored in a unique identification field of a block in the data stream;

declaring the block containing physical block identification word [R'(0),R'(1), ... ,R'(L−1)] as the block to be identified if the comparison results in a number of remainders which differ by less than or equal to a threshold number of remainders; and declaring the block containing physical block identification word R' as not being the block to be identified if the comparison results in a number of remainders which differ by more than a threshold number of remainders.

35. The method of claim 34 wherein the step of choosing information M chooses information M which a physical address of the block to be identified.

36. The method of claim 34 further comprising the step of:

providing information Mp representing a unique characteristic of a presently identified block having a unique identification field including a physical block identification word [Rp(0),Rp(1), ... ,Rp(L−1)];

and wherein the step of producing an expected physical block identification word [R(0),R(1), ... ,R(L−1)] further comprises the steps of:

determining the difference E in location between the presently identified block and the block to be identified by subtracting the information Mp from the information M;

verifying that the absolute value of the difference E is less than the smallest moduli A(i) for i=0,1, ... ,L−1;

if the difference E is negative, producing temporary remainders [Rt(0),Rt(1), ... ,Rt(L−1)] by adding to each of the remainders Rp(i) of the physical block identification word of the present block the difference E and the corresponding moduli A(i) for i=0,1, ... ,L−1;

if the difference E is positive, producing temporary remainders [Rt(0),Rt(1), ... ,Rt(L−1)] by adding to each of the remainders Rp(i) of the physical block identification word of the present block the difference E for i= 0,1, ... ,L−1; and producing a physical block identification word [R(0), R(1), ... ,R(L−1)] for the block to be identified, wherein for i=0,1, ... ,L−1 each said remainder R(i) is equal to the corresponding temporary remainder Rt(i) if said temporary remainder Rt(i) is less than the corresponding moduli A(i), and each said remainder R(i) is equal to the corresponding temporary remainder Rt(i) minus the corresponding moduli A(i) if the temporary remainder Rt(i) is greater than or equal to the corresponding moduli.

37. The method of claim 36 wherein the step of providing information Mp provides information Mp which is a physical address of the presently identified block.

38. The method of claim 34 wherein the step of producing a physical block identification word comprising the remainders [R(0),R(1), ... ,R(L−1)], wherein R(i)=M MOD A(i) for i=(0,1, ... ,L−1), comprises the steps of:

for each A(i),
  selecting j<A(i);
  M'=information M;
  repeating until q'=0:
    find q' and r' such that M'=q'*[A(i)+j]+r', with r'<A(i)+j;
    M'=r'+j*q';
  when q'=0, then
    if r'≧A(i) then R(i)=r'−A(i);
    if r'<A(i) then R(i)=r'.

39. The method of claim 34 wherein information M is binary information and the step of producing a physical block identification word comprising the remainders [R(0), R(1), ... ,R(L−1)], wherein R(i)=M MOD A(i) for i=(0,1, ... ,L−1), comprises the steps of:

for each A(i),
  selecting the smallest k such that A(i)≦2^k;
  j=2^k−A(i);
  M'=binary information M of s bits;

repeating until q'=0:
   r'=the least significant k bits of M';
   q'=the most significant s-k bits of M';
   M'=r'+j*q';
   when q'=0 then
      if r'≧A(i) then R(i)=r'−A(i);
      if r'<A(i) then R(i)=r'.

40. A method of identifying unique data blocks within a data stream comprising the steps of:

choosing information M corresponding to a unique characteristic of a block to be identified;

providing information Mp corresponding to a unique characteristic of a presently identified block having a unique identification field including a physical block identification word [Rp(0),Rp(1), . . . ,Rp(L−1)];

determining the difference E in location between the presently identified block and the block to be identified by subtracting the physical position information Mp from the physical position information M;

for all moduli A(i)=A(0),A(1), . . . ,A(L−1), letting A(0) be the smallest moduli for all A(i), verifying that the absolute value of the difference E is less than A(0) times the smallest moduli A(i) for i=1, . . . ,L−1;

if the difference E is negative, producing temporary remainders [Rt(1),Rt(2), . . . ,Rt(L−1)] by adding to each of the remainders Rp(i) of the physical block identification word of the present block the difference E and the corresponding moduli A(i) for i=1,2, . . . ,L−1;

if the difference E is positive, producing temporary remainders [Rt(1),Rt(2), . . . ,Rt(L−1)] by adding to each of the remainders Rp(i) of the physical block identification word of the present block the difference E for i=1,2, . . . ,L−1; and producing a physical block identification word [R(1), R(2), . . . ,R(L−1)] for the block to be identified, wherein for i=1,2, . . . ,L−1:
R(i)=Rt(i)+A(i) if Rt(i)<0;
R(i)=Rt(i) if 0≦Rt(i)<A(i);
R(i)=Rt(i)−A(i) if Rt(i)≧A(i), wherein this step is repeated up to A(0) times until Rt(i) is less than A(i);

comparing the remainders in the expected physical block identification word [R(1),R(2), . . . ,R(L−1)] to the remainders [R'(1),R'(2), . . . ,R'(L−1)] of a physical block identification word stored in the unique identification field of a block in the data stream;

declaring the block containing the remainders [R'(1), R'(1), . . . ,R'(L−1)] of the physical block identification word in the data stream as the block to be identified if the comparison results in a number of remainders which differ by less than or equal to a threshold number of remainders; and declaring the block containing the remainders [R'(1), R'(1), . . . ,R'(L−1)] of the physical block identification word in the data stream as not being the block to be identified if the comparison results in a number of remainders which differ by more than a threshold number of remainders.

41. The method of claim 40 wherein the step of providing information Mp provides information Mp which is a physical address of the presently identified block.

42. A method of locating data blocks on a data medium, said data blocks including a unique identification field and a data field, comprising, for each block, the steps of:

choosing a physical address M of a block to be located;

producing an expected physical block identification word comprising the remainders [R(0),R(1), . . . ,R(L−1)] wherein R(i)=M MOD A(i) for i=0,1, . . . ,L−1, [A(0),A(1), . . . ,A(L−1)] being integer moduli which are relative prime in pairs;

reading from the medium a physical block identification word [R'(0),R'(1), . . . ,R'(L−1)] for the block to be located;

comparing the remainders [R'(0),R'(1), . . . ,R'(L−1)] in the physical block identification word read to the remainders [R(0),R(1), . . . ,R(L−1)] in the expected physical block identification word;

identifying the block having physical block identification word [R'(0),R'(1), . . . ,R'(L−1)] as the block to be located if the comparison results in a number of remainders which differ by less than or equal to a threshold number of remainders; and identifying the block having physical block identification word [R'(0),R'(1), . . . ,R'(L−1)] as not being the block to be located if the comparison results in a number of remainders which differ by more than a threshold number of remainders.

43. The method of claim 42 wherein the block to be located is spaced on the medium from a present block having a physical address Mp and a unique identification field containing a physical block identification word [Rp(0), Rp(1), . . . ,Rp(L−1)], and wherein the step of producing an expected physical block identification word M=[R(0),R(1), . . . ,R(L−1)] comprises the steps of:

determining the difference E in location between the present block and the block to be located by subtracting the physical address Mp of the present block from the physical address M of the block to be located;

verifying that the absolute value of the difference E is less than the smallest moduli A(i) for i=0,1, . . . ,L−1;

if the difference E is negative, producing temporary remainders [Rt(0),Rt(1), . . . ,Rt(L−1)] by adding to each of the remainders Rp(i) of the physical block identification word of the present block the difference E and the corresponding moduli A(i) for i=0,1, . . . ,L−1;

if the difference E is positive, producing temporary remainders [Rt(0),Rt(1), . . . ,Rt(L−1)] by adding to each of the remainders Rp(i) of the physical block identification word of the present block the difference E for i=0,1, . . . ,L−1; and producing a physical block identification word [R(0), R(1), . . . ,R(L−1)] for the block to be located, wherein for i=0,1, . . . ,L−1 each said remainder R(i) is equal to the corresponding temporary remainder Rt(i) if said temporary remainder Rt(i) is less than the corresponding moduli A(i), and each said remainder R(i) is equal to the corresponding temporary remainder Rt(i) minus the corresponding moduli A(i) if the temporary remainder Rt(i) is greater than or equal to the corresponding moduli.

44. The method of claim 42 wherein the step of producing a physical block identification word comprising the remainders [R(0),R(1), . . . ,R(L−1)], wherein R(i)=M MOD A(i) for i=0,1, . . . ,L−1, comprises the steps of:

for each A(i),
   selecting j<A(i);
   M'=physical position information M;
   repeating until q'=0:
      find q' and r' such that M'=q'*[A(i)+j ]+r' with r'<A(i)+j;

$M'=r'+j*q'$;
when $q'=0$, then
   if $r' \geq A(i)$ then $R(i)=r'-A(i)$;
   if $r'<A(i)$ then $R(i)=r'$.

45. The method of claim 42 wherein the step of producing a physical block identification word comprising the remainders $[R(0),R(1),\ldots,R(L-1)]$, wherein $R(i)=M \text{ MOD } A(i)$ for $i=0,1,\ldots,L-1$, comprises the steps of:

for each $A(i)$,
  selecting the smallest k such that $A(i) \leq 2^k$;
  $j=2^k-A(i)$;
  $M'=$binary physical position information M of s bits;
  repeating until $q'=0$:
    $r'=$the least significant k bits of M';
    $q'=$the most significant s-k bits of M';
    $M'=r'+j*q'$;
  when $q'=0$ then
    if $r' \geq A(i)$ then $R(i)=r'-A(i)$;
    if $r'<A(i)$ then $R(i)=r'$.

46. The method of claim 42 wherein the step of choosing a physical address M chooses a physical address M corresponding to the position of the block on a track on a tape.

47. The method of claim 42 wherein the step of choosing a physical address M chooses a physical address M which is a radial track number corresponding to a unique track on a disk.

48. The method of claim 42 wherein the step of choosing a physical address M chooses a physical address M which is a sector number corresponding to a unique sector location on a track on a disk.

49. The method of claim 42 wherein the step of choosing a physical address M chooses a physical address M representing a disk surface, track location, and sector location on a disk.

50. A method of locating data blocks on a data medium comprising the steps of:

a. choosing a physical address M of a block to be located, the block to be located being spaced on the medium from a present block having a physical address Mp and a unique identification field including a physical block identification word $[Rp(0),Rp(1),\ldots,Rp(L-1)]$;

b. producing an expected physical block identification word comprising the remainders $[R(0),R(1),\ldots,R(L-1)]$ wherein $R(i)=M \text{ MOD } A(i)$ for $i=0,1,\ldots,L-1$, $[A(0),A(1),\ldots,A(L-1)]$ being integer moduli which are relative prime in pairs, the step of producing an expected physical block identification word comprising the steps of:

determining the difference E in location between the present block and the block to be located by subtracting the physical address Mp of the present block from the physical address M of the block to be located;

for all moduli $A(i)=A(0),A(1),\ldots,A(L-1)$, letting $A(0)$ be the smallest moduli for all $A(i)$, verifying that the absolute value of the difference E is less than $A(0)$ times the smallest moduli $A(i)$ for $i=1,\ldots,L-1$;

if the difference E is negative, producing temporary remainders $[Rt(1),Rt(2),\ldots,Rt(L-1)]$ by adding to each of the remainders Rp(i) of the physical block identification word of the present block the difference E and the corresponding moduli A(i) for $i=1,2,\ldots,L-1$;

if the difference E is positive, producing temporary remainders $[Rt(1), Rt(2),\ldots,Rt(L-1)]$ by adding to each of the remainders Rp(i) of the physical block identification word of the present block the difference E for $i=1,2,\ldots,L-1$; and producing a physical block identification word $[R(1), R(2),\ldots,R(L-1)]$ for the block to be located, wherein for $i=1,2,\ldots,L-1$:
$R(i)=Rt(i)+A(i)$ if $Rt(i)<0$;
$R(i)=Rt(i)$ if $0 \leq Rt(i)<A(i)$;
$R(i)=Rt(i)-A(i)$ if $Rt(i) \geq A(i)$, wherein this step is repeated up to $A(0)$ times until $Rt(i)$ is less than $A(i)$;

c. reading from the medium a physical block identification word $[R'(1),R'(2),\ldots,R'(L-1)]$ for the block to be located;

d. comparing the remainders $[R'(1),R'(2),\ldots,R'(L-1)]$ in the physical block identification word read to the remainders $[R(1),R(2),\ldots,R(L-1)]$ in the expected physical block identification word;

e. identifying the block having physical block identification word $[R'(1),R'(2),\ldots,R'(L-1)]$ as the block to be located if the comparison results in a number of remainders which differ by less than or equal to a threshold number of remainders; and f. identifying the block having physical block identification word $[R'(1),R'(2),\ldots,R'(L-1)]$ as not being the block to be located if the comparison results in a number of remainders which differ by more than a threshold number of remainders.

51. The method of claim 50 wherein the step of choosing a physical address M chooses a physical address M representing the position of the block on a track on a tape.

52. The method of claim 50 wherein the step of choosing a physical address M chooses a physical address M which is a radial track number corresponding to a unique track on a hard disk.

53. The method of claim 50 wherein the step of choosing a physical address M chooses a physical address M which is a sector number corresponding to a unique sector location of the block on a track on a hard disk.

54. The method of claim 50 wherein the step of choosing a physical address M chooses a physical address M representing a disk surface, radial track location, and sector location of the block on a hard disk.

\* \* \* \* \*